(12) United States Patent
Mizerit

(10) Patent No.: US 11,215,165 B2
(45) Date of Patent: Jan. 4, 2022

(54) VORTEX ACCELERATION WIND ENERGY TOWER

(71) Applicant: Branko Mizerit, Halifax (CA)

(72) Inventor: Branko Mizerit, Halifax (CA)

(73) Assignee: Branko Mizerit, Halifax (CA)

(*) Notice: Subject to any disclaimer, the term of this patent is extended or adjusted under 35 U.S.C. 154(b) by 0 days.

(21) Appl. No.: 16/978,099

(22) PCT Filed: Mar. 7, 2019

(86) PCT No.: PCT/CA2019/050279
§ 371 (c)(1),
(2) Date: Sep. 3, 2020

(87) PCT Pub. No.: WO2019/169498
PCT Pub. Date: Sep. 12, 2019

(65) Prior Publication Data
US 2021/0040937 A1 Feb. 11, 2021

(30) Foreign Application Priority Data
Mar. 8, 2018 (CA) .................... CA 2997766

(51) Int. Cl.
F03D 9/39 (2016.01)
F03D 3/00 (2006.01)
F03D 3/04 (2006.01)

(52) U.S. Cl.
CPC ............. F03D 9/39 (2016.05); F03D 3/005 (2013.01); F03D 3/0418 (2013.01); F03D 3/0427 (2013.01); F05B 2240/131 (2013.01); F05B 2240/132 (2013.01); F05B 2240/211 (2013.01); Y02B 10/30 (2013.01); Y02E 10/728 (2013.01); Y02E 10/74 (2013.01)

(58) Field of Classification Search
CPC .......... F03D 9/39; F03D 3/0418; F03D 3/005; F03D 3/0427; F05B 2240/131; F05B 2240/132; F05B 2240/211; Y02B 10/30; Y02E 10/74; Y02E 10/728
USPC ..................... 290/44, 55; 415/4.2, 4.4, 186
See application file for complete search history.

(56) References Cited

U.S. PATENT DOCUMENTS 204,481 A * 6/1878 Cleland .................. F03B 3/145
415/33
1,519,447 A * 12/1924 Fortier-Beaulieu ......................
F03D 3/0409
415/186

(Continued)

*Primary Examiner* — Pedro J Cuevas
(74) *Attorney, Agent, or Firm* — Branko Mizerit

(57) ABSTRACT

An energy-harvesting building structure has multiple levels, a vertical shaft (central vortex tower] to direct wind upward toward an outlet at the top, and multiple wind powered turbines in the shaft. Wind collection areas on multiple levels are exposed to multiple directions. Wind vanes pivot into a backstopped position for redirecting wind to spiral inward toward the shaft. Wind twisters receive and further redirect wind inward and upward into the shaft to feed an air vortex driving the turbines at different levels. Two concentric stages of wind vanes may be included within wind collection areas, with the inner stage vanes having a surface which deforms in one direction but not the other. The building can include occupancy zones between wind collection levels. Heated air can be released into the bottom of the shaft to feed the vortex. At a top level, another wind turbine can draw wind up the shaft.

20 Claims, 16 Drawing Sheets

(56) References Cited

U.S. PATENT DOCUMENTS

| | | | | |
|---|---|---|---|---|
| 4,018,543 A * | 4/1977 | Carson | F03D 1/04 | 415/208.2 |
| 4,236,866 A * | 12/1980 | Zapata Martinez | F03D 9/00 | 415/4.4 |
| 4,309,146 A * | 1/1982 | Hein | F03D 1/04 | 415/4.4 |
| 4,508,973 A * | 4/1985 | Payne | F03D 1/04 | 290/55 |
| 4,551,631 A * | 11/1985 | Trigilio | F03D 3/0409 | 290/55 |
| 5,381,048 A * | 1/1995 | Baird | F03G 6/045 | 290/55 |
| 5,503,530 A * | 4/1996 | Walters | F03D 3/0427 | 416/197 A |
| 5,664,418 A * | 9/1997 | Walters | F03D 3/0427 | 60/398 |
| 5,852,331 A * | 12/1998 | Giorgini | F03D 3/0409 | 290/55 |
| 6,352,473 B1 * | 3/2002 | Clark | F23L 17/10 | 454/18 |
| 6,582,291 B2 * | 6/2003 | Clark | F23L 17/10 | 454/19 |
| 6,590,300 B1 * | 7/2003 | Preito Santiago | F03D 1/04 | 290/55 |
| 6,790,007 B2 * | 9/2004 | Gingras | F03D 3/04 | 416/183 |
| 7,400,057 B2 * | 7/2008 | Sureshan | F03D 1/04 | 290/55 |
| 7,573,148 B2 * | 8/2009 | Nica | F03D 3/061 | 290/55 |
| 7,866,938 B2 * | 1/2011 | Kariya | F03D 13/20 | 415/4.4 |
| 8,128,337 B2 * | 3/2012 | Pezaris | F03D 9/25 | 415/4.2 |
| 8,210,817 B2 * | 7/2012 | Iskrenovic | F03D 3/0418 | 416/197 A |
| 8,226,369 B2 * | 7/2012 | Clark | F03D 3/061 | 416/236 R |
| 8,232,664 B2 * | 7/2012 | Stroup | F03D 3/065 | 290/55 |
| 8,314,508 B2 * | 11/2012 | Kawas | F03D 9/25 | 290/55 |
| 8,362,637 B2 * | 1/2013 | Kawas | H02S 10/12 | 290/55 |
| 8,461,715 B2 * | 6/2013 | Lee | F03D 9/25 | 290/55 |
| 8,598,751 B2 * | 12/2013 | Lin | H02K 9/06 | 310/63 |
| 8,613,586 B2 * | 12/2013 | Krasnov | F03D 7/06 | 415/4.2 |
| 8,829,704 B2 * | 9/2014 | Grigg | F03D 9/25 | 290/54 |
| D715,737 S * | 10/2014 | Cooper | D13/115 | |
| 8,961,103 B1 * | 2/2015 | Wolff | F03D 3/02 | 415/4.2 |
| 9,140,236 B2 * | 9/2015 | Iskrenovic | F03D 3/0418 | |
| 9,938,958 B2 * | 4/2018 | Rubio | F03B 3/183 | |
| 10,378,509 B2 * | 8/2019 | Theis | F03B 17/063 | |
| 10,612,515 B2 * | 4/2020 | Reyna | F03D 3/0427 | |
| 11,022,096 B2 * | 6/2021 | Monto | F03D 9/39 | |
| 2002/0068519 A1 * | 6/2002 | Clark | F23L 17/10 | 454/19 |
| 2008/0131281 A1 * | 6/2008 | Kariya | F03D 3/0427 | 416/183 |
| 2009/0257880 A1 * | 10/2009 | Clark | F03D 1/0608 | 416/223 R |
| 2009/0289459 A1 * | 11/2009 | Chung | F03D 3/0427 | 290/55 |
| 2010/0296913 A1 * | 11/2010 | Lee | F03D 3/04 | 415/4.2 |
| 2011/0140450 A1 * | 6/2011 | Kawas | F03D 3/0427 | 290/55 |
| 2011/0221196 A1 * | 9/2011 | Kawas | H02S 10/12 | 290/44 |
| 2011/0280707 A1 * | 11/2011 | Iskrenovic | F03D 3/067 | 415/4.2 |
| 2012/0121398 A1 * | 5/2012 | Iskrenovic | F03D 13/20 | 415/186 |
| 2012/0243996 A1 * | 9/2012 | Iskrenovic | F03D 13/20 | 416/132 B |
| 2012/0294739 A1 * | 11/2012 | Nishimura | A47L 5/22 | 417/410.1 |
| 2014/0023500 A1 * | 1/2014 | Rubio | F03D 3/0418 | 416/24 |
| 2016/0377053 A1 * | 12/2016 | Reyna | F03D 3/005 | 415/210.1 |
| 2020/0300217 A1 * | 9/2020 | Reyna | F03D 15/00 | |

\* cited by examiner

TUWI - Top unit Wind Intake
BUWI - Base Unit Wind Intake
GUWI - Ground Unit Wind Intake

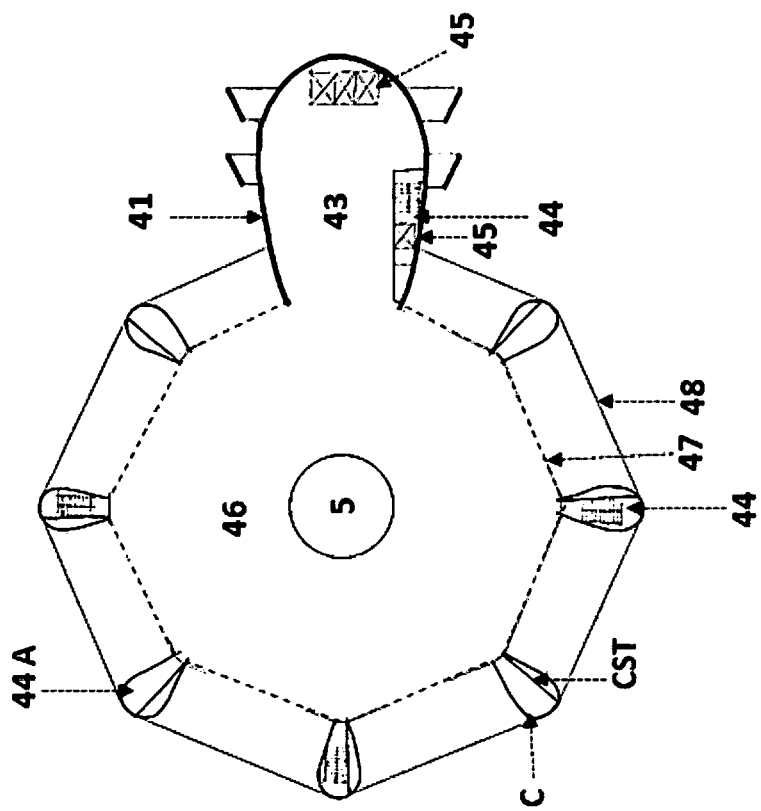
FIG. 14B
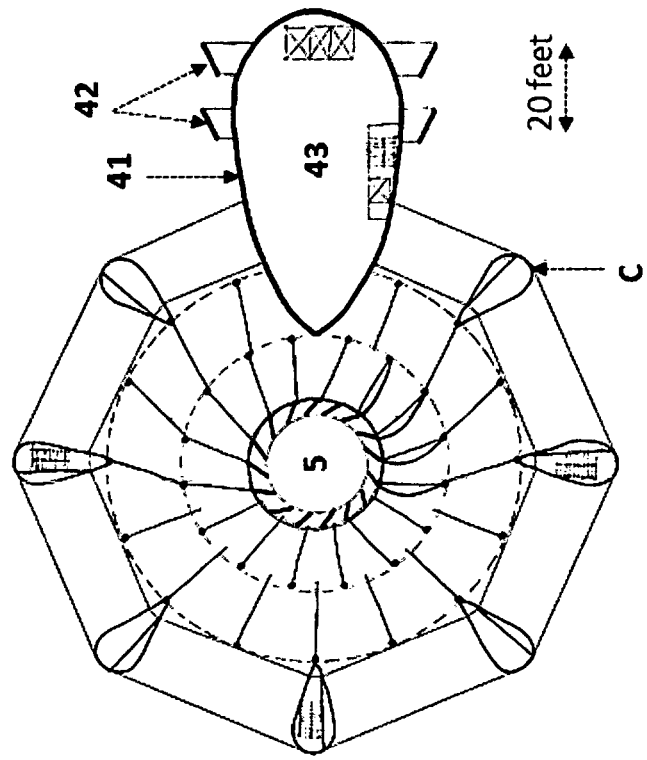
FIG. 14A
FIG. 14

VORTEX ACCELERATION WIND ENERGY TOWER

FIELD OF INVENTION

The present invention relates to energy harvesting structures in general and in particular to building structures which harvest and utilize wind, solar, geothermal and incineration energy.

BACKGROUND

Power Generating Windmills & Turbines

Over the years, oil, coal and other gas reserves used for industries producing energy and power, have been diminishing worldwide. While creating major pollution in the air, as well as our land and water supplies, these industries have become a major target for criticism by leading scientists and the public. Clean, pollution free, renewable energy projects have become the main focus of future energy production. Many concepts have been designed and built and new ones are being patented and tested every year. Among solar panels, wave, tide and many other types of power generating systems, wind based designs and turbine generators have had a major impact on today's planning for our present and future power plants. There are various configurations in the horizontal and vertical wind turbine design concepts, all with many advantages as well as disadvantages.

HAWTs (Horizontal Axes Wind Turbines) are the oldest ideas conceived many centuries ago. They have been modified since their creation, and today's HAWT are very sophisticated and much more efficient providing a viable alternative for creating clean energy.

Major challenges & disadvantages of HAWT: Even with advanced blade designs, in order to make it a viable energy source, the tower of the wind turbine needs to be tall and have large diameter blade sweep, which can be sensitive to destruction during very high wind. The axes need to be pointed into the wind, which requires wind sensing and orientation mechanism. HAWT are very unpopular close to residential and highly populated areas. They can also be danger as to birds and air traffic. Their servicing and maintenance can be very cumbersome and expensive, especially when replacing broken or worn out parts.

Vertical-axis wind turbines (VAWTs) are a type of wind turbine where the main rotor shaft is set transverse to the wind (but not necessarily vertically) while the main components are located at the base of the turbine. This arrangement allows the generator and gearbox to be located close to the ground, facilitating service and repair. VAWTs do not need to be pointed into the wind, which removes the need for wind-sensing and orientation mechanisms. Major drawbacks of the early designs (Savonius, Darrieus, cycloturbines as well as Giromill turbines) included the significant torque variation or "ripple" during each revolution, and the large bending moments on the blades. Later designs addressed the torque ripple issue by sweeping the blades helically.

A vertical axis wind turbine has its axis perpendicular to the wind streamlines and vertical to the ground. A more general term that includes this option is "transverse axis wind turbine" or "cross-flow wind turbine." For example, the original Darrieus patent, U.S. Pat. No. 1,835,018, includes both options. VAWTs offer a number of advantages over traditional (HAWTs):

VAWTs are omnidirectional and do not need to track the wind. This means they don't require a complex mechanism and motors to yaw the rotor and pitch the blades. They have the ability to take advantage of turbulent and gusty winds. Such winds are not harvested by HAWTs, and in fact cause accelerated fatigue for HAWTs.

The gearbox of a VAWT takes much less fatigue than that of a HAWT. Should it be required, replacement is less costly and simpler, as the gearbox is easily accessible at ground level. This means that a crane or other large equipment is not needed at the site, reducing cost and impact on the environment. Motor and gearbox failures generally increase the operational and maintenance costs of HAWT wind farms both on and offshore.

The research at Caltech University in California, physics and mathematics division, has also shown that a carefully designed wind farm using VAWTs can have an output power multiple times that of a HAWT wind farm of the same size. In the last two decades, many different advanced VAWT designs and projects have been developed, which have significantly improved the mechanical efficiency as well as power output. The characteristics of today's more sophisticated VAWT designs and projects can be divided in categories as follows:

Solar updraft type power plants (SUPP), also called Solar Chimney power plants, operate on a principle of a chimney updraft force. The air is heated at the bottom of the plant by solar panels of incineration of a waste heat and pulled into a tall chimney creating strong updraft winds, which power vertical or horizontal axes turbines either at their base, middle, top of the chimney, or a combination thereof. These power plants are extremely large and tall, occupying many acres of land. The construction of such plants requires a massive capital investment and a long term payback. The output of these plants is not constant, the efficiency still very low and very much depends on the height of the chimney and the surface area of solar collectors. One of many examples of this technology is described in US patent #2009/0212570 A1 and #US2004/0112055 A1.

Solar downdraft type power plants (SDPP) are also very large projects working on a principle of "Evaporatively Driven Downdraft Power Production System". It combines dry air, heated by the solar rays of the sun, with H20, which acts as a strong catalyst to create a powerful natural downdraft wind. The cooling, which is due to evaporation of the water droplets, combined with the weight of unevaporated droplets causes the air to be heavier as well as denser and sink through the depth of the tower. At the bottom of the tower the air is forced horizontally, driving multiple turbines as it exits the tower base. The plant maximum productivity is when ambient relative humidity is at its minimum (late afternoon). One example of this design is the project "Solar Wind Energy Tower" to be built in Arizona. The plant will occupy 640 acres with the tower height over 2,200 feet and 1,200 feet diameter (U.S. Pat. No. 8,517,662 B2). The construction of such plants requires a massive capital investment, therefore participation and investment at multiple levels, with a long term payback is very critical and difficult to obtain. Several such plants have been proposed, with much publicity and hype, but none have been constructed to this date.

Deflecting wind vanes VAWT typically consist of multiple vertically positioned fixed stator wind vanes, circumferentially spaced apart about the rotor. In a single or multiple row configuration, these fixed wind vanes act as a directional vertical surface forcing the wind into one desired direction and channel it through narrower section of the stator vanes, thus compressing the wind and its speed into the rotor blades to drive the turbine. There are many designs and projects in existence today and, even though they use the same principle, they all differ in how they capture and channel the wind into the rotor blades. Example of this principle can be seen in U.S. Pat. Nos. 6,740,989 B2, 5,852,331 A and #WO 2014043507 A1.

Compressed air VAWT or HAWT is designed on a principle of capturing the wind at the multidirectional top inlet collectors, forcing it downward through a funnel, which concentrates the wind via Ventura effect. The funnel than channels the wind further into the second horizontal Ventura narrows, where the turbine generators are located. The wind exits the funnel through a diffuser. One example of this concept is the project by Sheerwind INVELOX. The project has captured much publicity and investments, but some of the data and calculations published by the company have been questioned for its validity.

Vertical multi-stage VAWT represents a concept of stacking individual deflecting wind vane turbines as described in 008 on top of each other, thus multiplying the power output. One example of this concept is the project named KIONAS. According to the KIONAS Numerical & computational study published by Demos T. Tsahalis received in 2016 and accepted in 2017, the present project cannot compete with larger structures that produce power in range of 2 to 3 MW, but is a major competitor with smaller structures of 10 to 100 kW range.

Building surface wind turbines (BSWT) is a concept that exploits wind pressure on the vertical wall surface of a building, compresses it with angled horizontal wall type fixed wind vanes, to power small multiple HAWT. A computational study of this concept, entitled "A New Building-Integrated Wind Turbine System Utilizing the Building," by Jeongsu Park et al. and edited by Frede Blaabjerg was published in 2015 in Energies, vol. 8, issue 10, pp. 11846-11870. The conclusion states that the estimated producible power from this type of system, compared with the energy consumption of a tall residential building, could provide only about 6.3% of its needed electricity. No projects using this principle have been installed to date.

Building shape directed wind turbines (BSDWT) is a tall building concept using its slightly convex shape of the outside wall to guide the wind toward the mechanical floors where the WAVT are located. One example of this concept is the 1,015 ft. tall Pearl River Tower in Guangzhou, completed in 2013. The project represents an advanced approach in integrated renewable energy in high-rise buildings.

SUMMARY OF THE INVENTION

An object of the present invention is to provide an energy-harvesting building structure which harvests wind energy using a vortex configuration. The building can harvest energy from wind as well as from other energy sources such as solar, geothermal and incineration. Multiple energy sources can be cooperatively harvested and utilized, for example by using thermal energy to assist in maintaining the wind vortex. According to an aspect of the present invention, the energy-harvesting building structure includes: a plurality of levels; a central vortex tower passing each of the plurality of levels and configured to direct moving air received from the plurality of levels upward toward an outlet at a top of the building structure; at least one wind powered turbine located in the central vortex tower for harvesting energy from wind; a plurality of horizontally oriented wind intakes each disposed within a different respective one of the plurality of levels, each horizontal wind collection area exposed to an incident wind via wind inlets facing an exterior of the building structure in a plurality of different directions; in each horizontal wind collection area, a plurality of movable wind vanes each pivotably mounted on a respective vertical pivot axis, the movable wind vanes each having a limited swing range and configured, depending on exposure to the incident wind, to pivot into a corresponding position at an end of the limited swing range thereof for redirecting the incident wind to spiral inward toward the central vortex tower; and in at least one of the horizontally oriented wind intakes, a respective wind twister located radially inward of the plurality of movable wind vanes and defining a plurality of fixed air directing surfaces configured to receive and redirect the incident wind from the movable wind vanes, so that the incident wind continues to spiral inward and is directed upward into the central vortex tower to feed an air vortex in the central vortex tower for driving the at least one wind powered turbine.

Unlike all concepts of energy recovery designs and systems as described in the background, being used or publicized to date, which use only one or maximum two design principles to produce power, embodiments of the CIVAR Energy Tower are based on up to six different physical design principles: the physical design of a building itself, the windsurfing and sailing principle, the Ventura effect principle, the fireplace updraft principle, the bathroom fan exhaust principle and the tornado vortex principle. CIVAR Energy Tower is using the sun, the wind and the heat from geothermal system as well as waste incineration as its energy sources and integrates them into one interacting power generating machine using all six principles at the same time. CIVAR Energy Tower building structure is designed to take advantage of full wind exposure, to capture the wind at multiple levels and channel it via active wind vanes into the central vortex tower through inner fixed wind twisters. At the same time, heated air is forced into the bottom of the vortex tower via the ground wind intake. The chimney effect pulls the air upward and combined with compounded vortex wind intakes at multiple levels, the air is spun, exhilarated and funneled to the top tower exit, powering multiple generators at different levels. Traditionally, wind generating equipment forms either part of a tall tower or is installed on top of buildings and other structures, but all are very visible and unpopular in populated areas. In CIVAR Energy Tower there is no wind generating equipment visible from outside or inside of the building, making the building visually attractive and people friendly. Aside of being a power generating machine, the CIVAR Tower building is designed to accommodate multiple occupancies like, residential, office or light industrial type. The CIVAR Energy Tower will produce electricity 24/7 year around, and its structure is hurricane proof, offering high power production during high winds. Access energy generated during high winds can be stored either in multiple Lithium batteries or by pumping water to higher ground reservoir close by and use it to run water turbines into lower water reservoir during low power generation by the building. For maximum energy production, it is ideal to position CIVAR Energy Tower building on higher grounds or where there is lots of predictable wind exposure. CIVAR Energy Tower will be the first project, using all six physical principles at the same time to produce power, offer multiple occupancies within the same building and at the same time be physically not only non-intrusive, but a very attractive and people friendly building.

Embodiments of the present invention provide for a Compounded, Interactive, Vortex Acceleration Recovery (CIVAR) Energy Tower, which may potentially be a 100% clean energy recovery building with multiple interior occupancies, a structure specifically designed for generating energy to run the building energy requirements. This invention may use wind, solar, geothermal, and waste incineration heat and converts it into clean energy by combining all these sources into one interactive energy generating system. This invention may embody wind intakes at multiple levels of the building to interact within the central vortex tower in a vertically compounding way. In this invention, positive and negative forces of the wind in the central vortex tower work together in creating, accelerating, and multiplying the vortex wind force. There is no wind generating equipment visible from outside or inside, which makes the building visually attractive and people friendly.

BRIEF DESCRIPTION OF DRAWINGS

The following drawing descriptions are only a condensed description and/or general comments to clarify the content of the said drawings.

FIG. 14 Is depicting two drawings. 14A is shoving the floorplan of the CIVAR Energy Tower wind platform as depicted on FIG. 13. FIG. 14B represents a floorplan of the same building as 14A, but in occupancy levels with an open concept to be used for multiple occupancies.

DETAILED DESCRIPTION OF THE INVENTION

Figure 1:
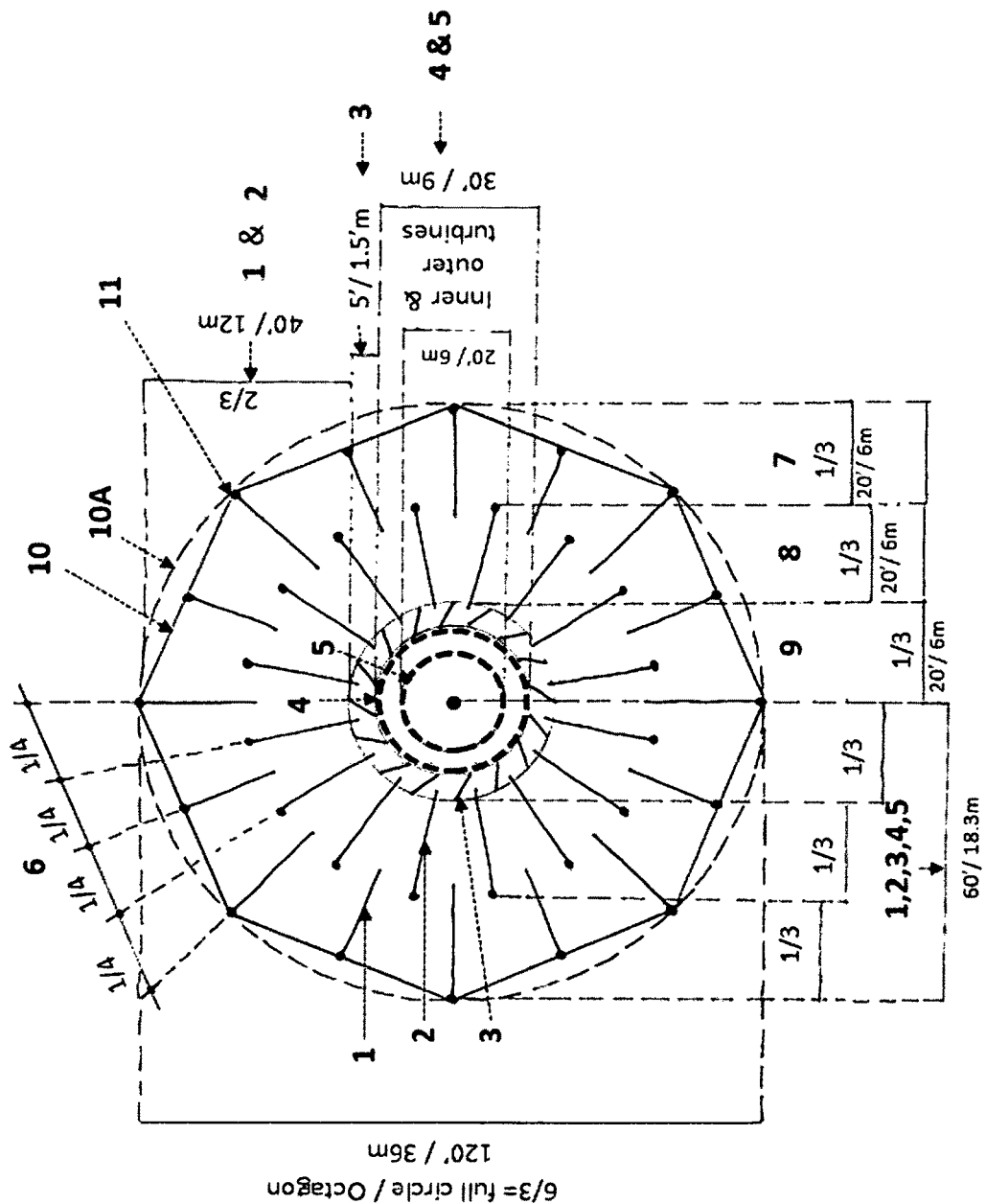
FIG. 1 A typical CIVAR Energy recovery wind platform showing a schematic drawing of the basic octagonal concept, its dimensions and proportions, as well as location and inter-relation of typical "Outside, Mid and Inner Ring" wind vanes and wind turbines.

The technology wording used herein is for the purpose of describing specific embodiments, not intended to be limiting to the invention. The terms "and/or" includes all combination of one or more of listed items. The singular words "a", "an", and "the" are intended to include singular and plural forms. The terms "comprises, comprising", "represents, representing", "consist of, consisting" specify the presence of stated features, operations, elements and components, but do not exclude the presence of other features, operations, elements, components and groups thereof. It is clarified that by describing the CIVAR Vertical Tower invention, a number of processes and functions are disclosed. Each has individual benefit and each can be used in conjunction with one, more or all of the other disclosed features, operations or components. The phrase "CIVAR Energy Tower", representing the present CIVAR Energy Tower invention and plurality thereof, is hereinafter used by the full said phrase, partial phrase, or by a singular phrase "CIVAR", all representing the said full phrase "CIVAR Energy Tower" invention.

The present disclosure is to be considered as specification and clarification of the invention and parts thereof, and it is not intended to limit the invention to the specific embodiments as illustrated on the drawings, outlined figures, numbers or description below. It is understood that the following drawings illustrating and or presenting the invention are of schematic and/or conceptual nature and do not represent the final construction of the said invention.

In the following description, for purpose of explanation, numerous specific details and functions are set forth in order to provide a thorough understanding of the present invention. To make the description of the foregoing CIVAR Energy Tower invention and said description easier to understand and read, it is understood that the said drawing description will be written in sequence, providing information, discussions and clarifications, following the progressional drawing numbers in said sequence from 01 to 16.

According to an illustrative embodiment, CIVAR Energy Tower invention embodies six independent components to interact simultaneously in capturing the wind, the sun and the heat from geothermal and/or waste incineration source and compounds it into a powerful vortex energy to run multiple power generators at different levels, producing 5 to 6 times more energy than a HAWT with same wind exposure. The CIVAR Energy Tower is based on six different and independent physical principles: the physical design of a building itself, the windsurfing and sailing principle, the Ventura effect principle, the fireplace updraft principle, the bathroom exhaust fan principle and the tornado vortex principle. The said principles will be discussed and referred to singularly or as in plurality by the following drawings from FIG. 1 to FIG. 16.

FIG. 1

The physical design of the building embodies an octagonal structure of various heights. Other multi-angled building and/or circular configuration can be used as a modification of the said octagonal design. A multi-angled building structure refers to a (generally convex) structure which may have five, six or more sidewalls in a regular polygonal shape, for example. The height and the diameter of the said octagonal structure determines the final amount of the CIVAR Energy Tower power generation as well as interior space available for various occupancies. As shown on FIG. 1, the floorplan of CIVAR building wind platform, comprised of several components. The octagonal building 10 fills the outside radius 10A (dotted line) and its radius is divided into 3 equals sections: the outside ring 7, the mid ring 8 and the inner ring 9 comprising of sections 3, 4 and 5. In this present configuration, the rings are shown to be 20 feet (6 m) in width, but can be modified to accommodate various needs. Other important features of the building design are discussed and referred to in FIGS. 5, 6, 7, 9, 11, and 12 to 15.

The windsurfing and sailing principle is used in CIVAR Energy Tower by installing two rows of pivoting and deflecting wind vanes. As shown on FIG. 1, the outside ring 7, which embodies vertically pivoting wind vanes 1 with the pivoting point 11 on the outside perimeter of the building, are constructed of rigged material. The mid ring 8, which embodies vertically pivoting wind vanes 2, with the pivoting point facing outward, consist of flexible, bending material, and/or ridged moving parts, installed over an open ridged pivoting frame, carrying the said vanes. More detailed description of the wind vanes clarifies in FIGS. 2, 3 and 4. As shown on FIG. 1, the pivoting point of wind vanes 2, forming part of ring 8, are located in the middle, between the outside vanes 1, forming part of ring 7. Such division divides one straight side of the octagonal building into four equal sections 6.

The inner ring 3, hereafter referred to as "the inner ring", constitutes of ¼ (5 feet) of the inner ring 9, which is in total 20 feet wide and which also includes wind turbine 4 and 5, representing ¾ (25 feet) of the said ring, embodies multiple vertically fixed angled wind vanes. Inner wind vanes starting points are positioned in the center of every wind vane 2 and are angled into the right direction starting from the point of wind entry (positioned in the canter of said wind vanes 2), to continue accelerating the wind flow, while beneficially increasing the power of central wind vortex and consequently the said vortex angle of attack onto the blades of wind generators 4 and 5. More specific discussions on the inner wind vanes are in description of FIGS. 8 and 9.

FIG. 2

The overall schematic drawing of the CIVAR Tower typical wind platform, with some possible slight variations thereof at different levels, is depicting the function of the wind vanes 1 and 2, their pivoting points 11 and the said vane's swing range 12. The vertical wind vanes are swung on their pivoting point 11 by the wind, depending from which direction the wind is entering the CIVAR structure. The further away from the center of the platform, the ridged wind vanes 1 are swung by the force of the incoming wind until they touch the pivoting point of the wind vanes 2. The wind vanes 2 consist of an open rigid frame with the sail with battens or bending panel positioned on the said frame's lea side of the incoming wind direction. Like in windsurfing and sailing, where the principle is based on using the power of the wind with the curvature of a sail, which are adjusted by trimming to capture maximum exposure and wind power to drive the vessel. In the CIVAR concept, two rows of pivoting wind vanes and the sail curvature principles are used to guide the wind with a limited and possibly minimum resistance to the inner tower wind turbines. Once the incoming wind hits the open frame of vane 2 with the sail or bending panel on the lea side of the frame, the sail or bending panel protrude into a curved configuration away from the frame to allow the wind to flow unencumbered to the inner ring fixed vanes 3, which additionally increase the angle of the wind entry into the central tower. This configuration allows the CIVAR wind platform invention to capture a large portion (e.g. approaching 100%) of the wind force approaching the said platform, while limiting energy loss due to wind turbulence and lack of advantageous wind vane designs or locations thereof.

The open frame of a wind vane can include an outer frame, openings allowing wind to pass openings within the outer frame, and one or more supports such as cross beams between opposing edges of the outer frame. The sail or bending panel (also referred to as a deformable portion) is located on one side of the open frame. When the sail or bending panel is on the leeward side of the open frame, wind passes through the openings in the outer frame and causes the sail or bending panel to curve away from the open frame. When the sail or bending panel is on the windward side of the open frame, wind pushes the sail or bending panel toward the open frame. The sail or bending panel (e.g. the supports thereof) thus contacts the supports and/or outer frame. This contact inhibits further motion of the sail or bending panel through the open frame's opening and causes the sail or bending panel to have a substantially flat configuration, contacting the supports.

Figure 2:
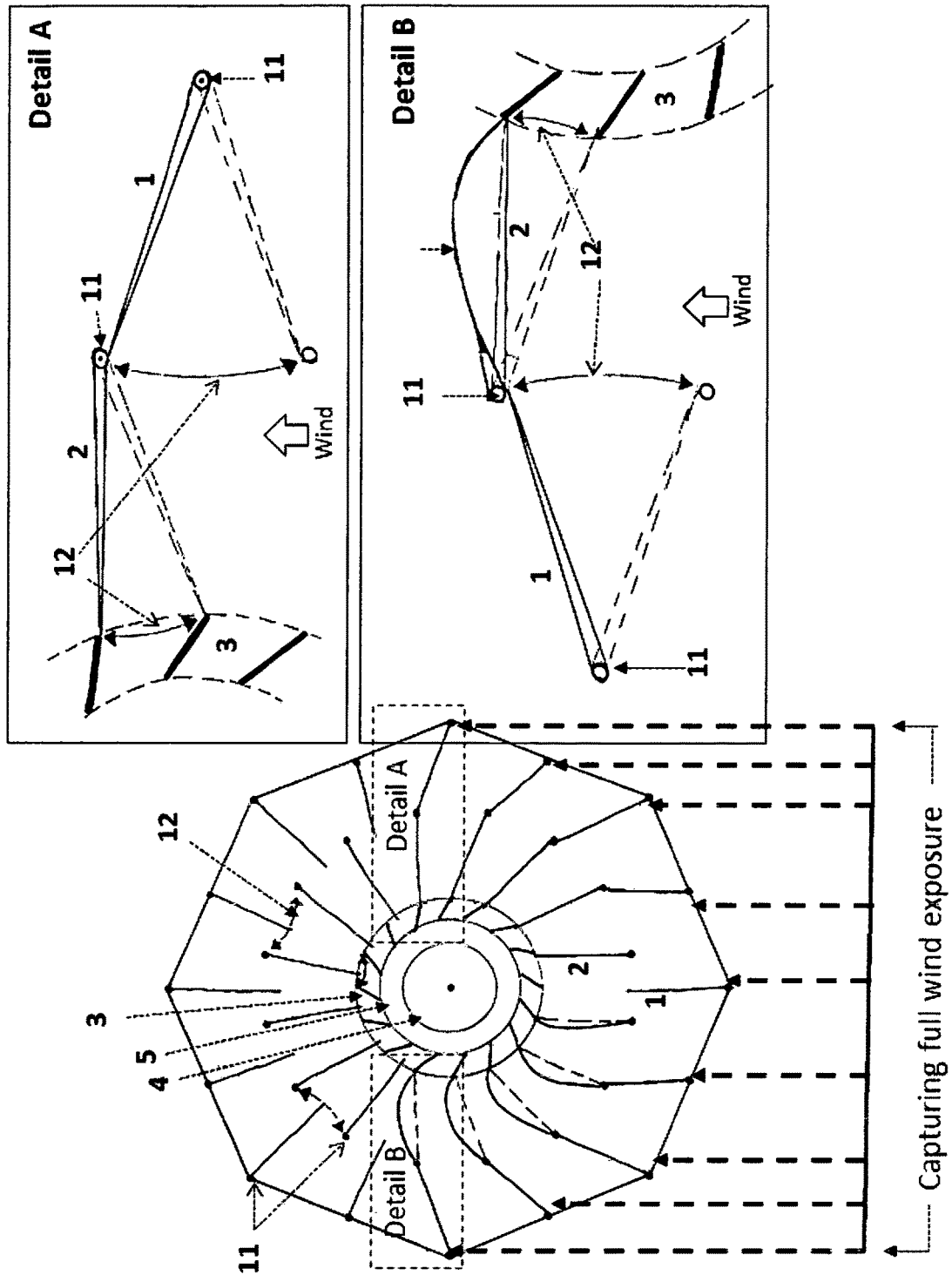
FIG. 2 A typical CIVAR Wind Energy recovery platform showing a schematic drawing of the basic octagonal concept capturing maximum wind exposure with outside ring pivoting and mid ring bending wind vanes (borrowed from sailing principles) to channel it into the "Inner Ring" fixed wind twisters.

FIG. 2 includes drawings Detail A & B showing schematic operation of wind vanes 1 & 2 in relation to the wind direction and the location of said vanes pivoting points. If the pivoting point of the vanes is on the right side of the incoming wind direction (looking down wind) Detail A, vane 1 will hit the pivoting point of vane 2 (see range of swing 12). The sail or bending panel is in this case located on the windward side of the frame and is pushed by the wind into the straight ridged open frame, thus preventing the sail or panel from protracting. The supports of the open frame can inhibit the sail or panel from protracting in this case. The straight wind vane 2 will be pushed by the wind to touch the fixed vane of the ring 3 and guide the wind into its opening unencumbered and without disruptive or hindering forces.

Detail B (on FIG. 2), is also showing schematic operation of wind vanes 1 & 2 in relation to the wind direction and the location of said vane's pivoting points. If the pivoting point of the vanes is on the left side of the incoming wind direction (looking down wind) Detail B, vane 1 will hit the pivoting point (range of swing 12) of vane 2. Thus vane 1 pivots to a backstopped position at the end of its swing range. Vane 2 similarly pivots to a backstopped position at the end of its swing range when it contacts an edge of fixed vane 3. The sail, hereafter representing both, the said sail or the bending panel, is in this case located on the lea side of the straight ridged open frame thus giving the sail or panel once it hits the inner ring fixed vanes 3, a clear way to protract and deflect its surface to accommodate the full force of the wind to flow into said ring 3 vanes, and guide the wind through ring 3 fixed vane openings, substantially unencumbered and without (or with limited) disruptive or hindering forces.

FIG. 3

Figure 3:
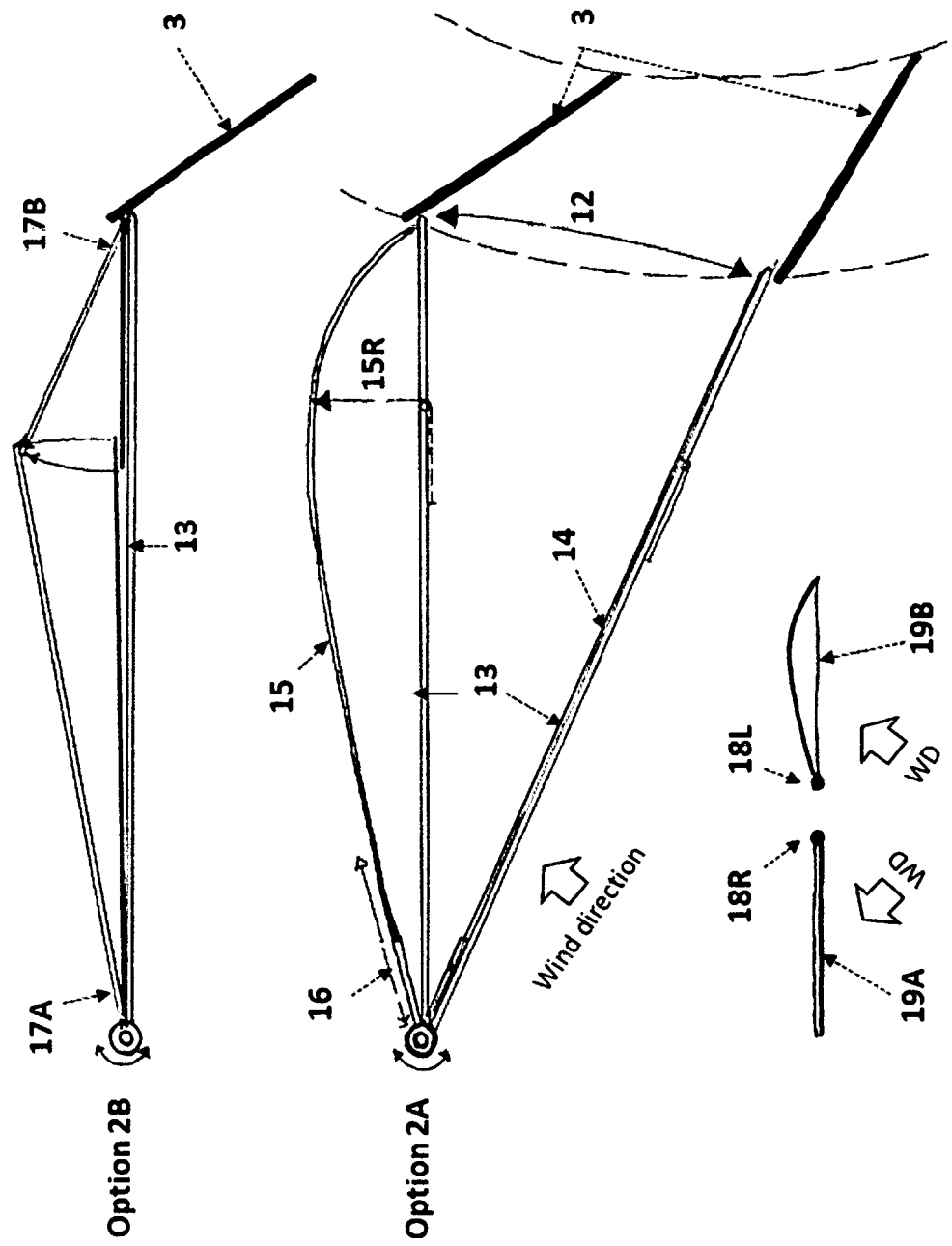
FIG. 3 Depicting details of the CIVAR Mid Ring bending wind vanes, showing two options. Option A with sail type flexible wind vane design and option B with ridged wind vane design. The drawing also shows the location of wind vane pivoting points in relation to the wind direction.

FIG. 3 shows a schematic depiction of mid ring 2 pivoting wind vanes/sales with battens and automatic protraction and/or bending capabilities thereof, to maximize the direction of the wind flow to the stationary inner ring vane 3. The drawing also shows the wind vane pivoting action in relation to the wind leeward and/or windward approach. Specifically, the drawing shows two options of the wind vane construction concept.

Option 2A depicts a schematic drawing of the wind vane 2 ridged open frame 13, protractible sail with battens 15 in a protracted position using a protraction restrictor 15R to control the curve of the protracted sail to accommodate any angle of the wind approaching the said vane. With no force of the wind, onto vane 2, to protract the sail, the said protracted sail automatically retracts 14 with help of tension cables or springs loads around pivoting location behind the open frame of vane 2 and into the sail housing 16 located at wind vane 2 pivoting point. This concept is borrowed from self-furling sail principle used on sailboats. This is similar to the self-furling principle on a sail boat.

Option 2B depicts wind vane 2 schematic drawing of the ridged open frame 13 and two or more hinged ridged panels in a protracted position to accommodate any angle of the wind approaching said vane 2. With no force of the wind, onto the vane 2, the protracted ridged panels automatically retract with help of tension cables or springs loads around pivoting location back to a straight position behind the open frame of vane 2. The drawing also depicts vanes 2 in a protracted position behind the open frame and 19B with its pivoting location on the left 18L and a vane in a strait position, in front of the open frame 19A with its pivoting positions on the right 18R, both in relation to the incoming wind.

FIG. 4

Figure 4:
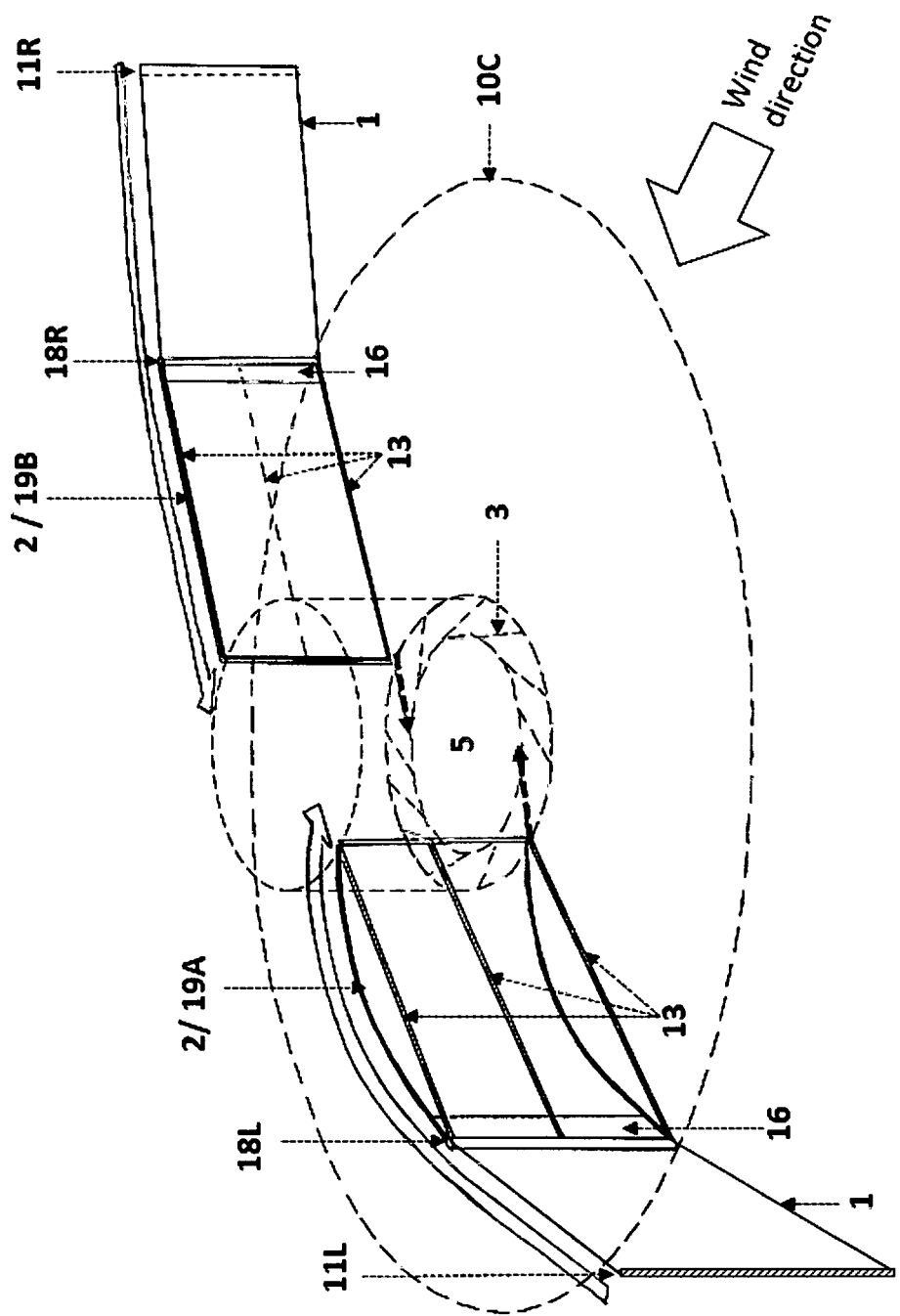
FIG. 4 Is a 3 Dimensional drawing of the CIVAR Mid Ring bending wind vanes, showing deflection of wind vanes in relation to the wind direction and the pivoting points.

FIG. 4 is a 3 dimensional schematic drawing showing one typical wind vane 1 and 2, each said wind vane being situated on the opposite side of the central CIVAR tower 5. The drawing shows the direction of the incoming wind to simultaneously activating both, 1 and 2 wind vanes at the opposite sides of the central tower 5, channeling the wind into opposite direction of each other. The drawing also shows a circle 10C on which all pivoting points of the wind vanes 2 are located.

Looking downwind, the left side vane 1 is touching the downwind pivoting point 18L of vane 2 and vane 2 with its ridged open frame 13 is pushed onto the downwind fixed wind vane 3. The sail, hereafter representing both, the sail and the bending panel, of vane 2 is pushed by the wind to protract from its housing 16 to form a curved sail 19A to smoothly redirect the wind direction and channel it to the ring 3 fixed wind vanes.

Simultaneously, at the opposite side vane 1 with its pivoting point on right side 11R will also hit the downwind pivoting point of vane 2. The sail is in this case located on the windward side of the frame and is pushed by the wind into the straight ridged open frame of the wind vane 2, thus preventing the sail from protracting 19B. The straight wind vane frame 13 of the vane 2 with its pivoting point on its right side 18R, will be pushed by the wind to touch the downwind fixed vane of ring 3 and guide the wind into its opening unencumbered and without disruptive or hindering forces.

FIG. 5

Figure 5:
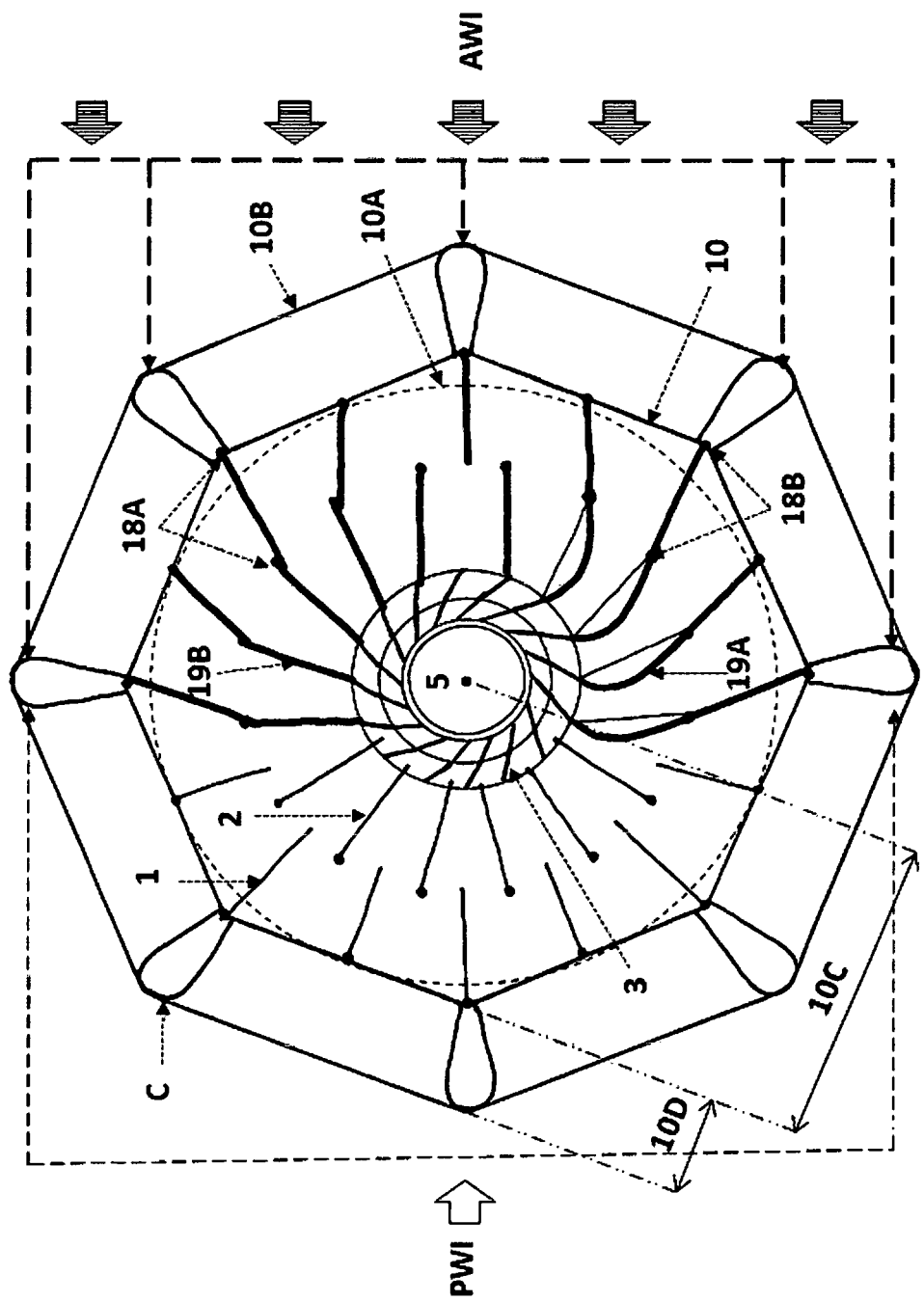
FIG. 5 Is a floorplan showing the full wind exposure of a typical wind platform with Outside Ring pivoting wind vanes, Mid Ring pivoting and deflecting wind vanes, Inner Ring fixed wind twister vanes, as well as vertical wind walls.

FIG. 5 is a drawing depicting the floor plan of a CIVAR Energy Tower building in its entirety and both, the full "active wind exposure" on the windward side AWI, as well as the "passive wind intake" on the opposite side PWI. As shown on the drawing, on the active windward side AWI, the windward wind platform is forcing the wind into the central vertical tower 5 via active wind vanes 1 and 2 and the inner ring fixed wind vanes 3, which are angled with respect to the vertical direction, in order to increase the circular direction of the wind into a wind vortex, when entering the central vertical tower. Due to the design of the inner wind vanes 3, pushing the wind upwards (see FIG. 8), the power of the incoming spinning forced air from the active side of ring 3 wind platform AWI, creates negative pressure with a funneling effect on the passive side of the wind ring 3 platform PWI, siphoning additional available air through the inner ring 3 into the central vortex tower. The central vortex tower can also be described as a vertical shaft through which wind can flow upwardly.

Specifically, the drawing shows both pivoting wind vanes 1 and 2, with their pivoting points 18A showing its pivoting direction downwind to the right and in and pivoting points 18B showing its pivoting direction downwind to the left. On the left side looking downwind, said vanes 2, are pushed to touch downwind fixed vane 3 and are protracted 19A to smoothly divert the wind to move into direction of wind vanes 3. on the right side looking downwind, the said vanes 2, are pushed to touch downwind fixed vane of inner ring 3 and its sails are pressed against the vane's frame, creating a straight wind surface 19B to smoothly divert the wind to move into direction of the wind vanes 3.

Unlike depicted on the FIG. 1, the perimeter of the octagonal building 10 is located outside the circle 10A. This represents only a variation of scale and proportions and has limited to no effect on the functional part of CIVAR invention. The building dimensions as depicted in this present invention are comprised of dimension 10C, being same dimension as shown in FIG. 1, consisting of section 7, 8 and 9, totaling 60 feet, and 10D representing 20 feet, which represent ⅓ of the dimension 10C. The shown dimensions can be modified if the overall proportions and the function of the overall CIVAR Energy Tower is not compromised. The drawing also depicts eight vertical parts of the building C, situated on the outside perimeter of building's straight lanes connecting point, forming part of the overall design of the CIVAR Energy Tower invention. This concept is also part of the invention improving the wind exposure by design of the building itself. The purpose of the said vertical wind walls C is to channel even more wind into the octagonal building's wind platforms, showing with arrows of AWI, and to also act as a structural member of the overall CIVAR Tower structure. The outside horizontal perimeter lines 10B connecting the vertical wind walls C represent sloped horizontal walls, also shown and described in FIGS. 7, 9, 10, 11, 12, and 15 to facilitate the compression of the incoming wind before entering the wind platform.

FIG. 6

Figure 6:
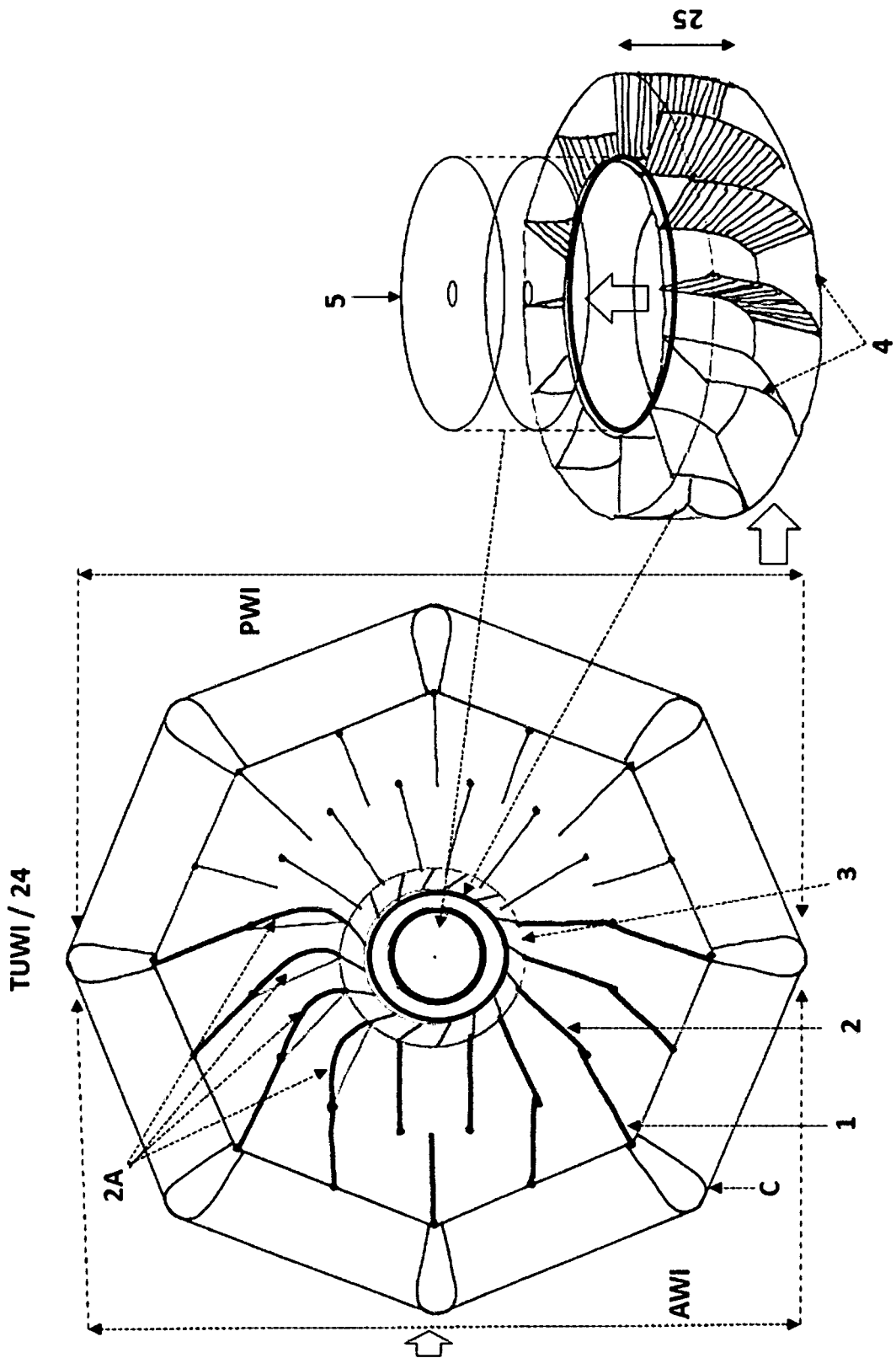
FIG. 6 Is a floorplan of the top level wind intake showing the outside and inside wind turbine in the CIVAR Vortex Tower. It also depicts a 3D drawing of the outside wind turbine with its curved or slated blades.
Figure 7:
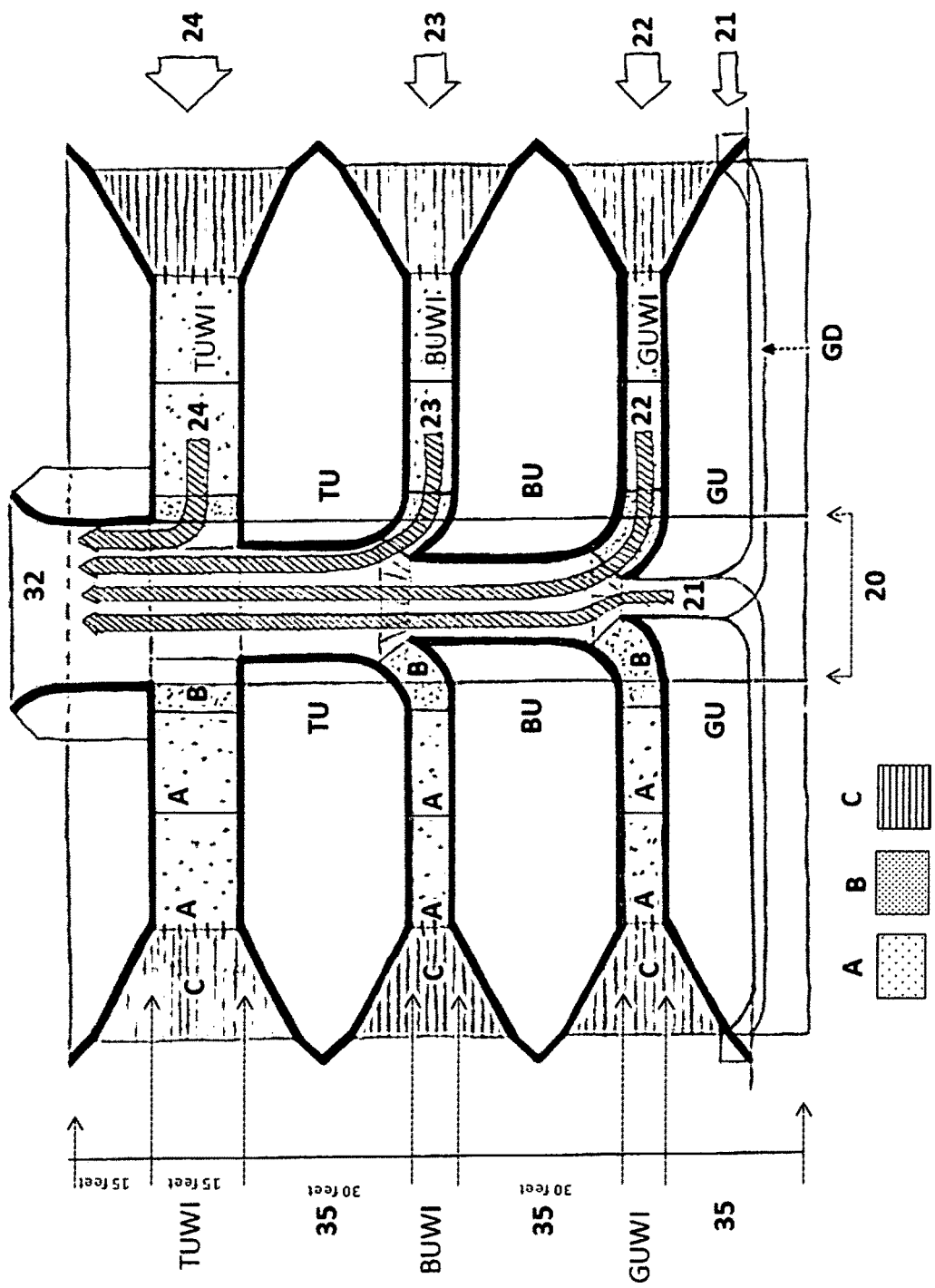
FIG. 7 Is a cross section of the CIVAR Vertical Tower schematic concept, showing multiple wind inlets at different building levels and the compounding effect of the increasingly powerful wind vortex.

FIG. 6 is a schematic drawing showing the basic octagonal concept of the CIVAR Energy Tower wind platform, capturing maximum available wind exposure AWI available passive air exposure PWI and channel it smoothly with vertical wind walls C, outside pivoting wind vanes 1, mid ring pivoting wind vane 2 and 2A, and the inner ring fixed wind vanes 3, to accelerate and maximize the wind power to run its wind turbines. Specifically, the drawing is showing the top of the CIVAR Energy tower wind intake platform with top unit wind intake TUWI/24 (FIG. 7).

The drawing also encompasses a 3 dimensional conceptual drawing of the top level wind platform wind turbine and its blade orientation 4, which can be adjusted to optimize various needs. The height 25 of the turbine 4 and 5 is variable, depending on the height of the top wind platform inlet. The twin top level turbine embodies an outside turbine 4, separated from the inner circle wind turbine 5 by a vertical cylinder type separation, driven by the top level wind intake, powered by incoming horizontal wing, and an inner circle wind turbine 5 driven by the central tower vortex wind coming from below.

The wind intakes are generally horizontally oriented, and can also be referred to as horizontal wind collection areas.

FIG. 7

Figure 9:
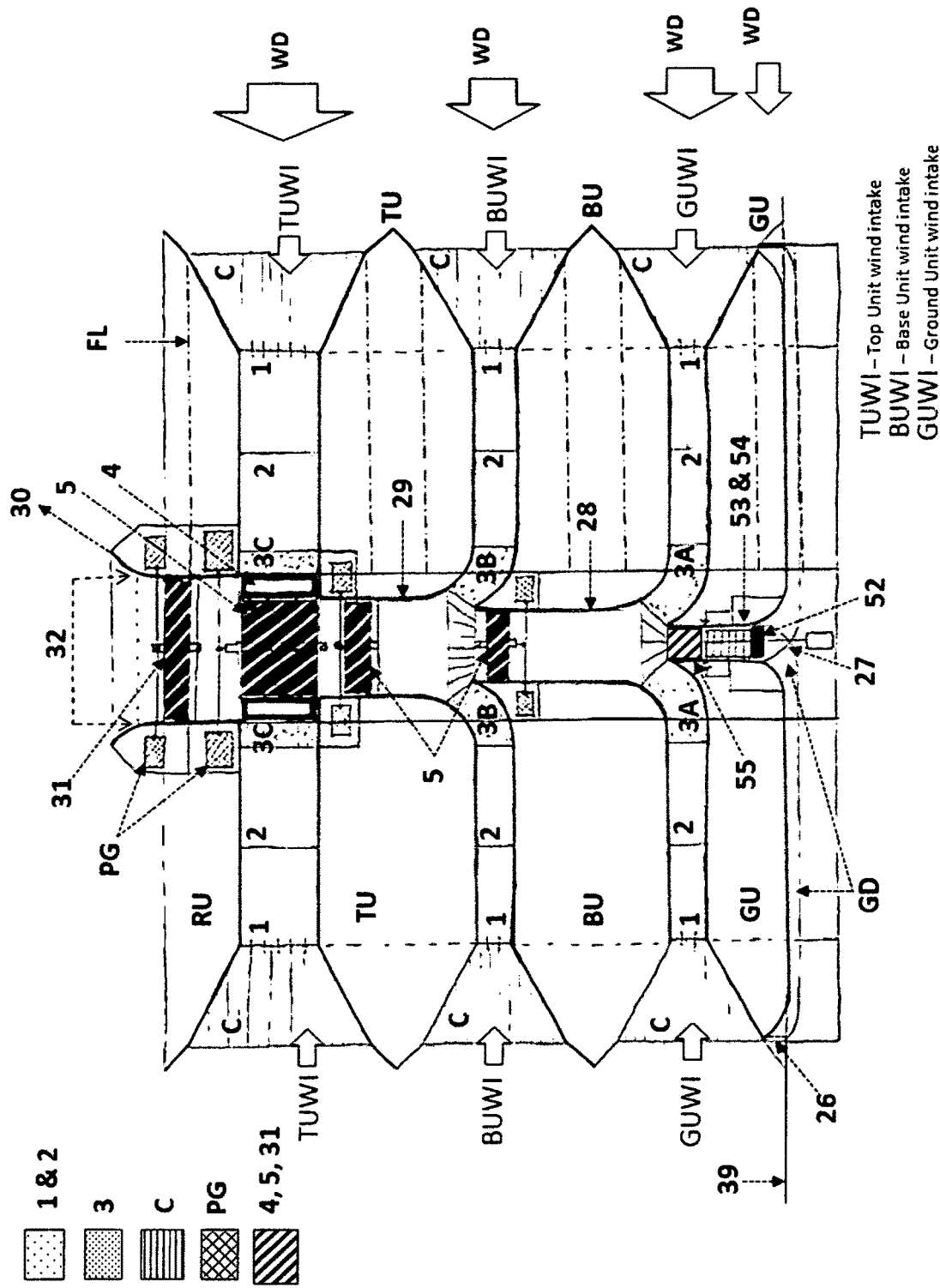
FIG. 9 Is a schematic cross section of the CIVAR Energy Tower building, showing all parts and components of the compounding wind vortex concept as well as location of wind turbines.

FIG. 7 represents a typical cross section of a CIVAR Energy Tower building, which embodies units for interior occupancy, such as ground unit GU, base unit BU, top unit TU and the roof top, with slopped exterior walls to capture the wind using Ventura principle and guide it into individual CIVAR Tower wind platforms. This schematic cross section shows wind intakes at ground unit wind intake GUWI, base unit wind intake BUWI, and the top unit wind intake TUWI, to interact vertically in a compounding way, creating accelerated vortex wind power as the wind is forced upward toward the vortex exit tower 32. Every wind intake level represents a powerful circular wind vortex entering the vertical tower adding to the total power of the said vortex to run wind turbines at different levels (FIG. 9).

The ground unit embodies a central mechanical room 20 where the air is heated by heat exchangers and pushed by wind intakes into the bottom of the central vortex tower 21 via ground ducting lines and inlets at the ground level of building 21. The acceleration of the vortex wind power is created by the following physical principles: First, positive pressure is entering the central vortex tower through wind intakes 21. The forced air is heated via heat exchangers and rises like in a chimney venting a hot fireplace flame. This, in itself, creates an updraft force in the central vortex tower. Second, is the design of the building itself acting like a wind collector by using its vertical and horizontal shapes to channel and compress the incoming wind. Third, the wind is being compressed by GU, BU and TU units, which encompass interior occupancies and are designed with perimeter sloped walls using Ventura principal and channeling it into the wind platforms 22, 23 and 24, where the wind is compressed again. Forth, the compressed channeled wind entering the wind platforms is channeled via pivoting and flexible wind vanes A, embodying vanes 1 and 2, using sailing and windsurfing principles. Fifth, are the fixed inner wind vanes B embodying inner vanes 3, which are angled and sloped upward (see FIG. 8) creating a strong spinning motion mowing upward, using the principle of a tornado vortex. Sixth, is the principle of wind suction representing the principal of a bathroom fan, which is created by multiple wind turbines within the CIVAR central vortex tower and the top inner wind turbine 5. Acting in conjunction with the outer turbine 4, as well as creating a strong upward suction effect, the multiple wind turbines are pulling the vortex upward toward the vortex tower exit opening. This multiple "push and pull" or "blowing and siphoning" principle makes the CIVAR Energy Tower invention a potentially unique example of harvesting wind energy and multiplying its power to run the vertical axes wind turbines at multiple levels.

FIG. 8

Figure 8:
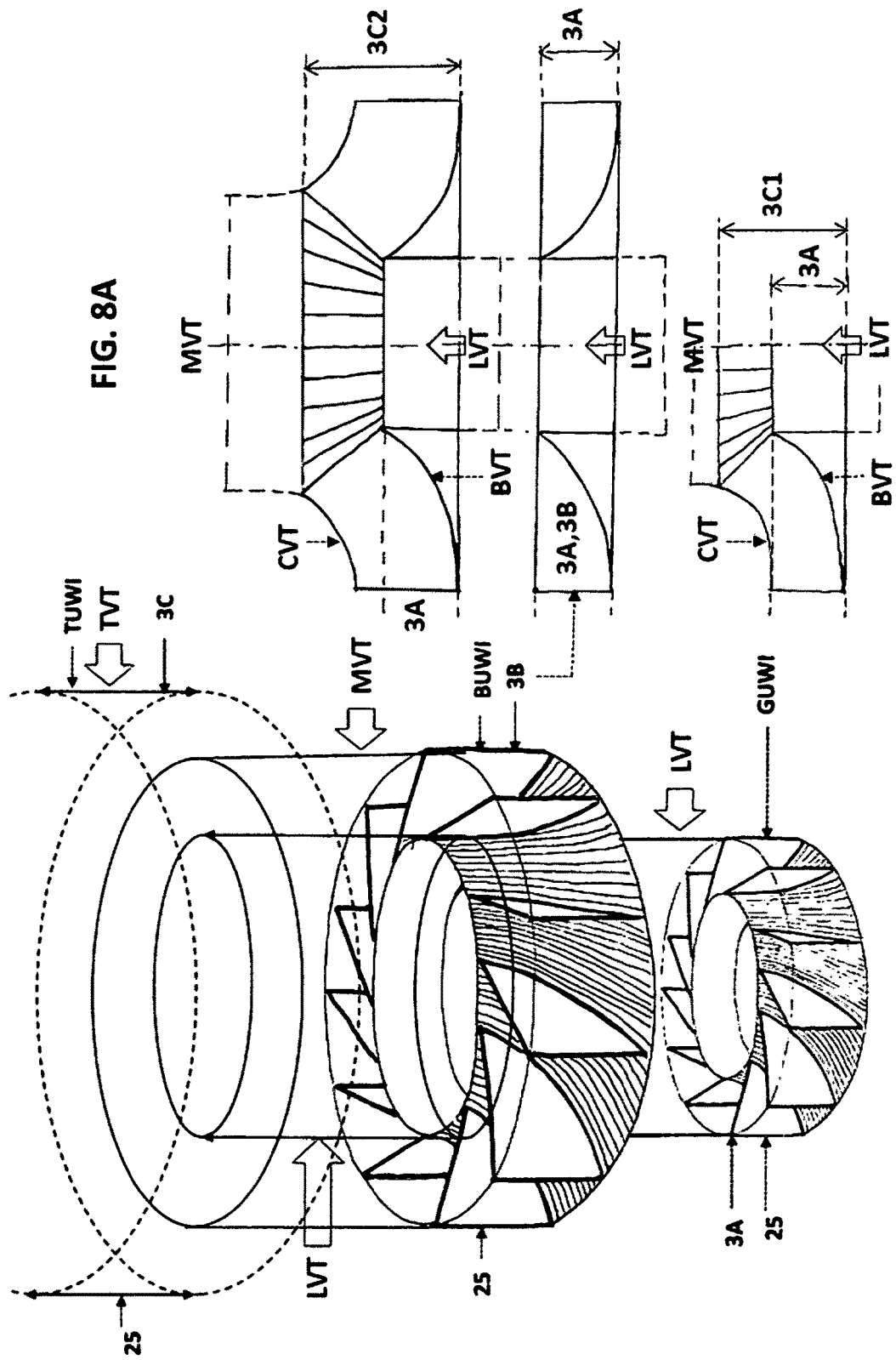
FIG. 8 Is a 3 Dimensional schematic drawing, showing typical Inner Ring wind twisters from two level wind entrances working together in increasing the power of CIVAE the Central Tower wind vortex.

FIG. 8 represents a 3 dimensional conceptual drawing of multiple wind platform wind entry and inner ring wind vanes 3, which act as wind twisters, forcing the wind into a spinning upward direction. Both, the lower and the middle wind twisters are of the same design but differ in the size of their diameter. In the lower vortex tower, the stationary inner ring wind twister 3A is situated at the ground unit wind intake GUWI. The said wind twister forces the incoming wind into a circular upward direction and into the CIVAR lower vortex tower LVT. At the next level above base unit BU, is the base unit wind intake BUWI, which represent (looking upward), the next level of compressed incoming wind. The inner ring fixed wind twister 3B forces the incoming wind into a circular upward direction and into the CIVAR central middle vortex tower MVT, which has a larger diameter than the lower vortex tower LVT. This configuration introduces new wind into the CIVAR central vortex tower, thus increasing the wind mass and the vortex force as it moves upward.

At the next level above the top unit TU (FIG. 7), is the top unit wind intake TUWI, which represent, looking upward, the last level of incoming compressed wind. The said top unit wind intake TUWI is proportionally twice as high as the wind intakes below. For clarity, this drawing only indicates this level, but does not show any details. It is understood that the top inner ring fixed wind twister 3C forces the wind in circular direction only, but not upward as do wind twisters 3A and 3B. The reason for that configuration is the design of the top twin turbine, comprising of two types of blades design. As shown on FIG. 6, the perimeter wind turbine 4 has blades angled upward and is powered only by the incoming compressed wind at level TUWI. The inner wind turbine 5, forming part of the said top twin turbine, is powered by the wind vortex created in the CIVAR central vortex tower. The top perimeter wind turbine with angled blades (FIG. 6), forcing the compressed incoming wind upward into the CIVAR vortex tower exit opening, has a larger diameter than the inner central wind tower thus increasing the wind mass and the vortex force as it moves upward (see FIG. 9). The top vortex tower TVT is larger in diameter than the wind vortex towers below LVT and MVT. Like the lower levels configuration, this concept introduces more new wind into the CIVAR central vortex tower, thus increasing the wind mass and the vortex force as it moves upward toward the exit opening of the central vortex tower 32.

The perimeter wind turbine 4 is also referred to as a radially outer section of the twin turbine, and the inner wind turbine 5 is also referred to as a radially inner section of the twin turbine. A cylindrical sidewall is disposed between the radially outer section and the radially inner section, so as to inhibit wind from flowing between the two sections, and instead to divert wind upward.

FIG. 8 also includes FIG. 8A showing a cross section of the wind twister design. The drawing depicts three wind twister cross sections, from which the middle one is also shown in the 3 Dimensional drawing (to the left of the cross section FIG. 8A), being 3A and 3B. The wind twister on FIG. 3A has been adapted to specifically accommodate CIVAR Tower purpose and function. The middle drawing is showing the wind twister 3A, which has the same vertical height of the said twister throughout its physical entirety. CIVAR wind twister, embodying the base of the wind twister BVT and the ceiling of the said wind twister CVT, has the same basic design as shown in twister 3A, but a specific design feature in which the incoming peripheral height is increased as it enters the vertical CIVAR central tower. This specific progressionally upward curved design of the base and ceiling of the said twister is characteristic to CIVAR central vortex tower invention and is shown in two options 3C1 and 3C2.

CIVAR wind twister invention embodies the same design components, as shown on FIG. 8A example 3A, but differs in twister's inner circle exit height. In the design 3C1, the incoming wind height opening is the same as the inner ring of the central opening but the wind twister blades are curved to the height 3C1, following the curvature of the twister's ceiling as shown on the drawing, representing additional 66% of total height of the incoming wind intake. In design 3C2 the incoming wind height opening, being the ceiling of the wind twister is 25% higher than the inner ring of the central opening and the wind twister blades are curved, following the twister's curved ceiling to the height 3C2, representing additional 50% of the total height of incoming wind intake as shown on the drawing. CIVAR wind twister dimensions and/or % of heights as described hereunto are modifiable to meet various needs, as long as the said variation stays true to the design concept itself. The purpose of both 3C1 and 3C2 wind twister designs is to eliminate possible crosswind turbulence entering the CIVAR central vortex tower. Wind coming from any direction will always be forced to enter the CIVAR central tower in one direction, feeding the wind vortex within the said tower.

FIG. 9

FIG. 9 is a schematic cross section of the CIVAR Energy Tower building, showing all components of the wind vortex manipulation starting at the bottom of the building and ending at the top vortex tower exit opening. Specifically, the drawing shows the perimeter vertical wind walls C, channeling the wind into the building. The ground unit GU, base unit BU, top unit TU and roof unit RU compress the air into the wind platforms and their wind intakes, such as ground unit wind intake GUWI, base unit wind intake BUWI, top unit wind intake TUWI and the roof unit, forming part of the TUWI. Within the GUWI, BUWI and TUWI wind platforms the drawing depicts the pivoting wind vane 1, the pivoting and protracting wind vane 2, as well inner ring fixed wind twisters 3. The broken/dotted horizontal lines FL represent floors for interior occupancies in units GU, BU, TU and RU. The CIVAR Energy Tower invention as described and depicted in previous paragraphs, the compounding vortex process is described and discussed in the foregoing paragraphs.

Figure 16:
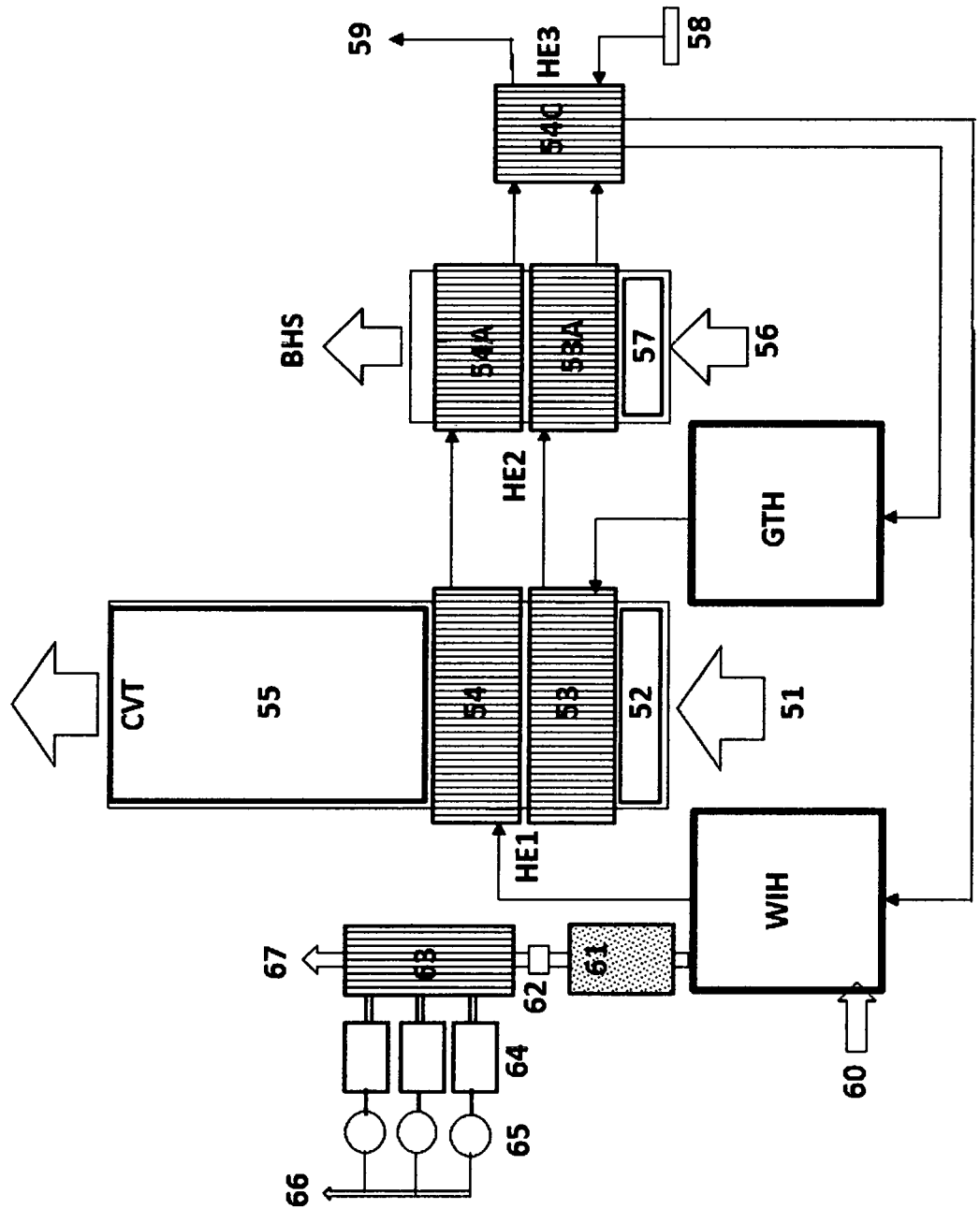
FIG. 16 Schematically shows a mechanical room that can be located at a bottom of the CIVAR Energy Tower.

Centrally located, at the bottom of the CIVAR tower is the mechanical room 20 (FIGS. 7 and 16). The incoming air through ground ducting GD, with its multiple air inlets 38 (FIG. 11), located above ground 39, and through horizontal louvres 26 is pulled into a central air collector 27 where it is heated with multiple heat exchangers 53 and 54 (FIG. 16) in the mechanical room with the heat from geothermal heat pump and waste incineration, which is obtained from various sources. Like in a fireplace chimney, the hot air naturally rises pulling the air through the ducting system GD. Even when there is absolutely no wind, the air is naturally pulled through the ground ducting GD, propelling an electric fan 52, set in neutral gear, before entering the heat exchanger cylinder above, and is then twisted into a circular motion by fixed warm type vanes 55 (FIG. 16), situated on the inside walls of the cylinder leading to the top of the exiting outlet. When windy, the wind enters the ground wind intakes GU, changing the natural updraft principal into a forced hot air heating system pushing hot forced upward draft through the circular warm vane cylinder unit 55 into the central vortex tower. If more forced air is desired, the electric fan 52 can be activated creating more force to the updraft wind.

At ground level wind platform above the ground unit GU, the compressed wind enters the ground unit wind intake GUWI, which is channeled with wind vanes 1 and 2 into the first inner ring fixed wind twister 3A. The wind is forced into a circular upward motion, creating an additional upward force, pulling the hot air from the smaller diameter hot air outlet (the size and the ratio of the diameter increase are variable and can be modified to accommodate various needs). This creates the beginning of the vertical wind vortex in the CIVAR central tower. As clarified in paragraph 032, and depicted in FIG. 5, the active wind intake AWI will create negative pressure on the opposite side of the wind twister 3A, being the passive wind intake PWI, thus syphoning additional available air to feed the vertically growing vortex.

At the base level wind platform above unit BU, the compressed wind enters the base unit wind intake BUWI, which is channeled with wind vanes 1 and 2 into the second inner ring fixed wind twister 3B (the size and the ratio of the wind twister diameter increase are variable and can be modified to accommodate various needs). The wind is forced into a circular upward motion, creating an additional upward force, pulling the hot air twister from the smaller diameter vortex tower below. The second wind intake at BUWI introduces additional new wind into the CIVAR central vortex tower, thus increasing the wind mass and the vortex force as it moves upward. This interaction creates a compounded force of vertical wind vortex in the CIVAR central tower. Same as clarified in paragraph 032 and depicted FIG. 5, the base level active wind intake AWI will also create negative pressure on the opposite side, being the passive wind intake PWI, thus syphoning additional air to feed the vertically growing vortex.

At the top level wind platform above the top unit TU, the compressed wind enters the top unit wind intake TUWI. The said top unit wind intake TUWI is proportionally twice as high as wind intakes bellow. The compressed wind which is channeled with wind vanes 1 and 2 into the top inner ring fixed wind twister 3C, is the same diameter as the wind twister below, but due to the increased wind inlet size, higher to match the wind platform height. The diameter of this top twister 3 is variable and can be modified to accommodate various needs. The wind is forced upward by the outside perimeter wind turbine 4, creating an additional upward force, pulling the hot air twisters with the top inner wind turbine 5 from smaller diameter vortex tower below. The third wind intake at TUWI introduces new wind to the CIVAR energy tower, thus increasing the wind mass and the vortex force as it moves upward to drive the exit turbine 31.

This compounded force of vertical wind vortex in the CIVAR central tower is a result of three major principles: firstly, the heated air forced into the bottom of the vortex tower; secondly, the positive driving force created by the forced compressed wind intakes GUWI, BUWI, and TUWI, channeled by the wind twisters 3A, 3B, 3C in a circular and 3A, 3B, also into an upward direction into the central tower, creating powerful positive vortex force; and thirdly, the suction force created by the action of the driving force and the top level wind turbine 5, creating additional suction force, pulling the vortex through the turbine to the exit opening of the CIVAR vortex tower. The vortex tower 32 is deflected at the exit opening 30 to deflect the vortex wind as it exits the tower.

The drawing also depicts the location of the wind turbine within the tower, as well as generators and associated mechanical rooms, located outside the CIVAR central vortex tower, at multiple levels. The power generators PG are equipped with gearless transmission to run more efficient and productive in lower or higher winds. Power generating equipment PG is located close to the respective wind turbines 4 and 5, but can be relocated to meet various needs.

FIG. 10

Figure 10:
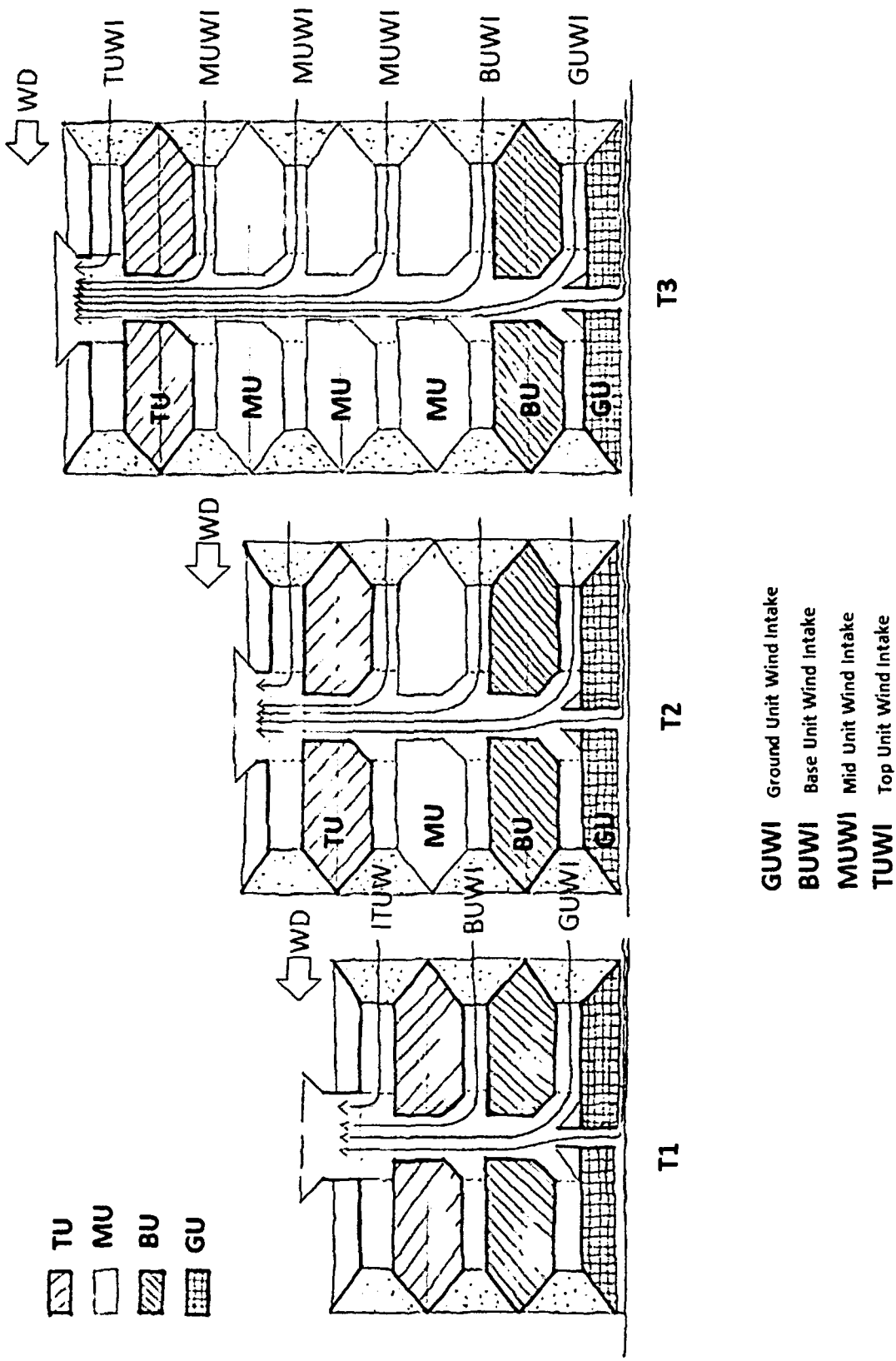
FIG. 10 Is depicting a schematic drawing of CIVAR Energy Tower multiple stacking of the Medium Unit, which will increase the vortex wind force by every level added to the tower.

FIG. 10 is a schematic depiction showing vertical stacking options of the CIVAR Energy Tower by introducing a middle unit MU to be placed and/or stacked between the base unit BU and the top unit TU. The said middle unit MU is identical in its entirety to the base unit BU, but small variations can be accommodated if the entire vortex tower concept and functions thereof are not compromised. The drawing is showing three stacking options, which represent the variation, but are not limited to the shown depiction, of the said CIVAR Energy Tower height and its power generating output.

The first schematic cross section drawing T1, represents the original CIVAR Energy Tower in its entirety as presently described, clarified and depicted in the drawings of this invention. Second optional variation T2, depicts the CIVAR Energy Tower with one middle unit MU positioned between the base unit BU and top unit TU. The third optional variation T3 depicts the CIVAR Energy Tower with three middle units MU positioned between the base unit BU and top unit TU. The drawing also shows the wind platform inlets on all three variations and their compounding wind effect as they increase the wind power by adding more inlets into the CIVAR central vortex tower.

FIG. 11

The conceptual exterior elevation drawing of the CIVAR Energy Tower building is also showing design options 37 of the vertical wind wall C, as well as design option of the sloped exterior walls, to form a triangular configuration, of typical interior occupancy units 35, such as GU, BU and TU as well as MU (FIG. 10). In this invention a typical height of said units accommodates three floors, but many variations thereof can be entertained as long as the function of the CIVAR Energy Tower is not compromised. The elevation drawing also depicts CIVAR tower wind inlets WI, ground wind intakes 38, finished exterior grade 39, and sloped exterior wall units 35 with its cladding options, such as solar panels 34 and 36 representing glass or solid panels.

Specifically, the drawing also shows variations of the wind wall C to be configured in different shapes, CA, CB and CC. In the present invention the drawings depict options CA and CC. Option CA is a flat (e.g. rectangular) wall shape. Option CB can be described as a tear-drop or bulged shape using flat wall sections. Option CC can be described as a tear-drop or bulged shape using curved wall sections. It is to be noted that the configuration CC is the most advantages for collecting wind via vertical wind walls. The exterior sloped design variation of the interior occupancy units 35, such as CU, BU, MU, TU are variable, but it is understood that the shallower the sloped walls are, the better is the wind flow into the wind platforms. The drawing shows option 35A and 35B, but many other design variations are acceptable as long as they do not hinder the wind flow to the wind platforms, as clarified in previous and foregoing paragraphs and drawings of the present invention. The top of the CIVAR Energy Tower is the central vortex tower opening with its inside walls sloped outward to divert the vortex wind 32 exiting the tower.

FIG. 12

Figure 11:
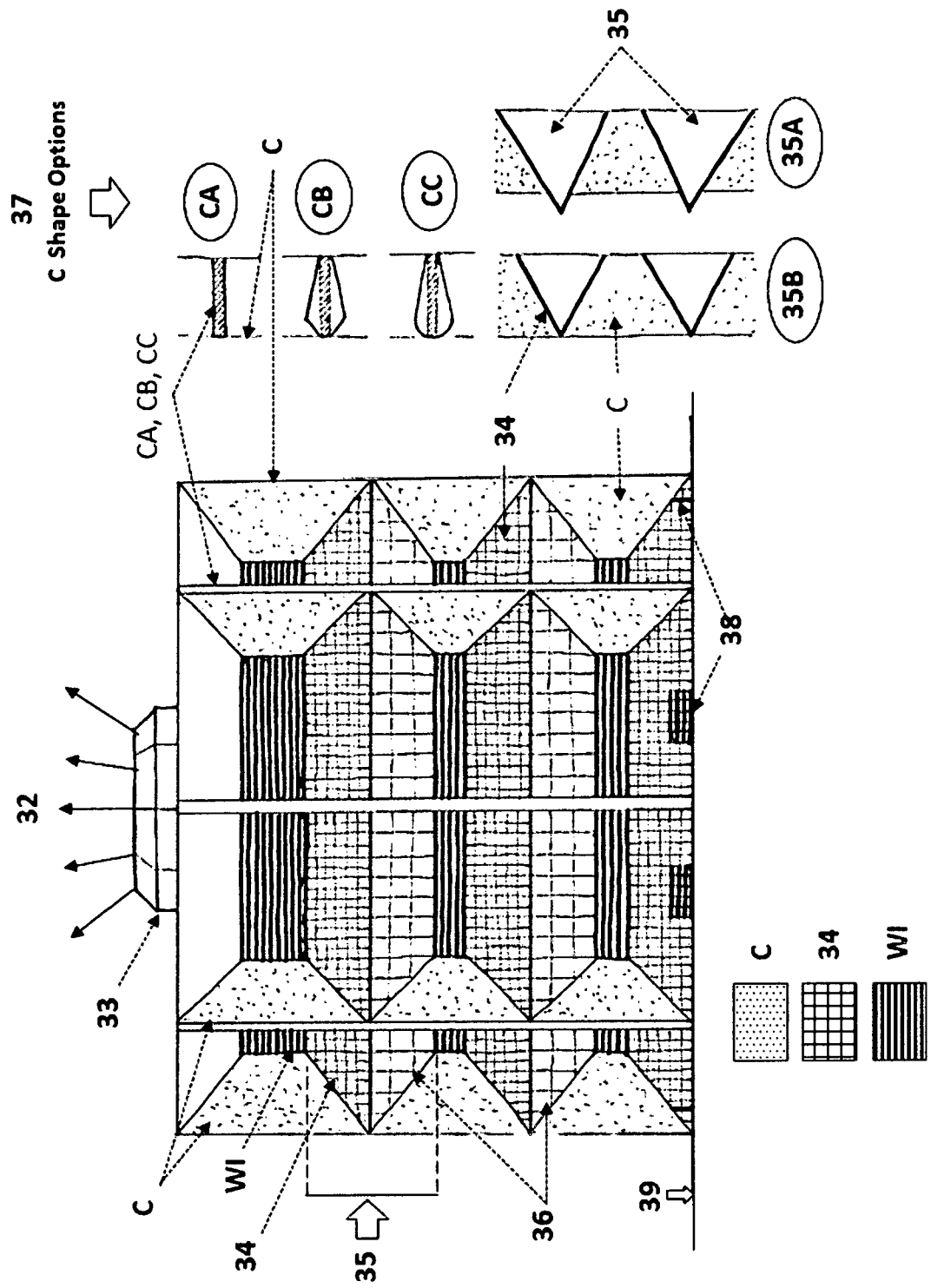
FIG. 11 Is a conceptual elevation of the CIVAR Energy Tower building exterior, showing multiple wind intakes, options for vertical wind walls and sloped peripheral walls as well as areas for multiple occupancy levels.
Figure 12:
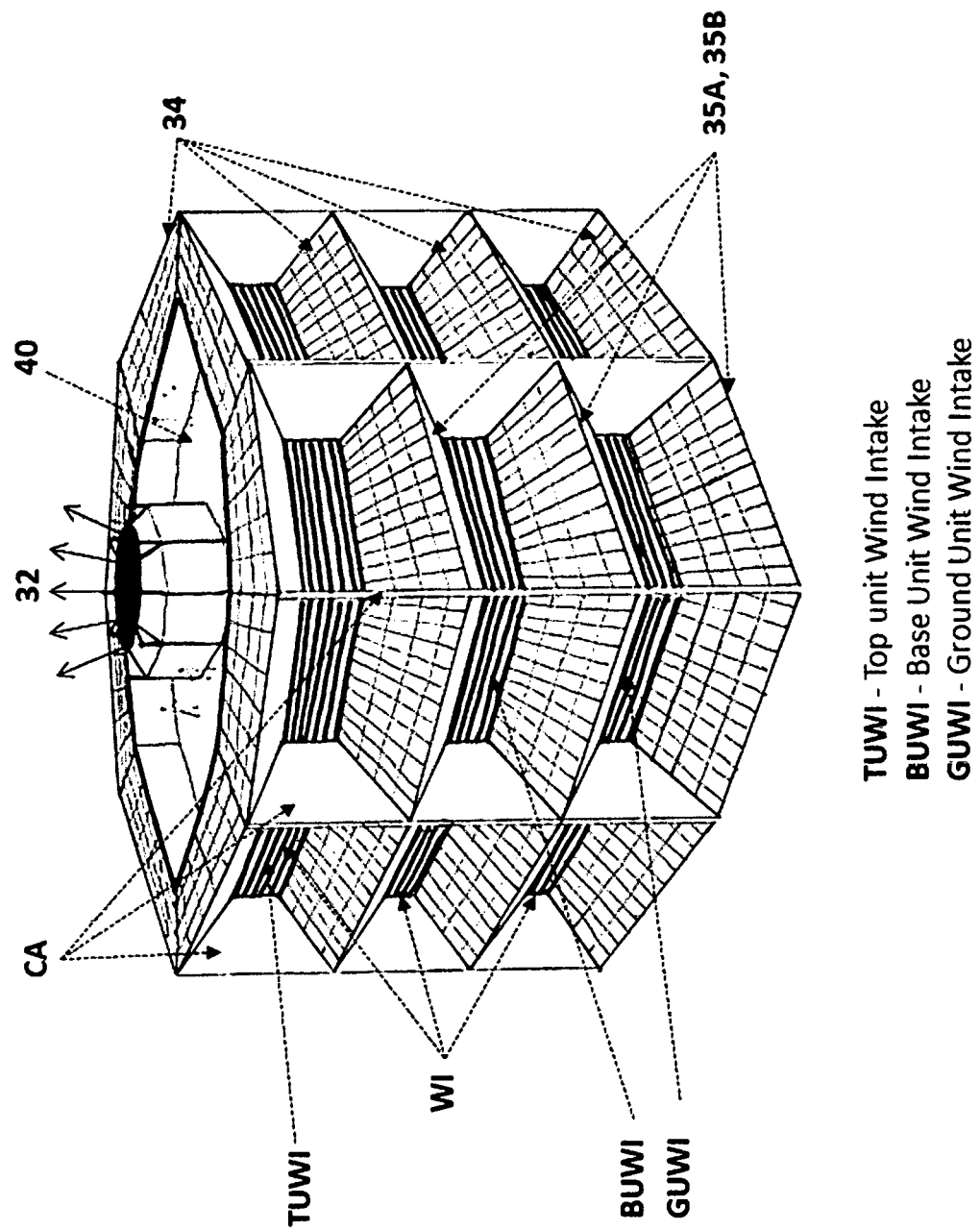
FIG. 12 Is a 3 Dimensional conceptual drawing of the completed octagonal CIVAR Energy Tower, showing wind intakes, wind walls, peripheral sloped walls and the defused vortex wind exit.

FIG. 12 is a conceptual 3 dimensional depiction of the octagonal CIVAR Energy Tower in its entirety, showing wind intakes at different levels, such as the ground unit wind intake GUWI, the base unit wind intake BUWI and the top unit wind intake TUWI. The wind intakes are shown with functional horizontal louvres, built from ridged, non-rusting water repelling materials, to open and close for either maintenance of the wind platform areas or increasing and decreasing the wind flow into the interior of wind platforms. For easier understanding of this drawing, the CIVAR tower's vertical wind walls are shown as option CA (see FIG. 11) and the interior occupancy units 35 with exterior sloped walls shown as option 35B. The exterior walls of the upper sloped walls of units 35 are cladded with clear solar panels 34, and the lower parts of the sloped walls are cladded with glass panels, bringing ample natural light into the interior of the said unit 35. The roof of the CIVAR Energy Tower building 40 is flat to accommodate additional solar collectors, such as spinning solar panels, or tracking solar dish collectors to provide direct energy or run sterling engine power generators. In the center of the CIVAR Tower is the opening of the central vortex tower for exiting and diverting the exiting vortex wind 32. The height of the exit tower can be increased to meet various needs.

FIG. 13

Figure 13:
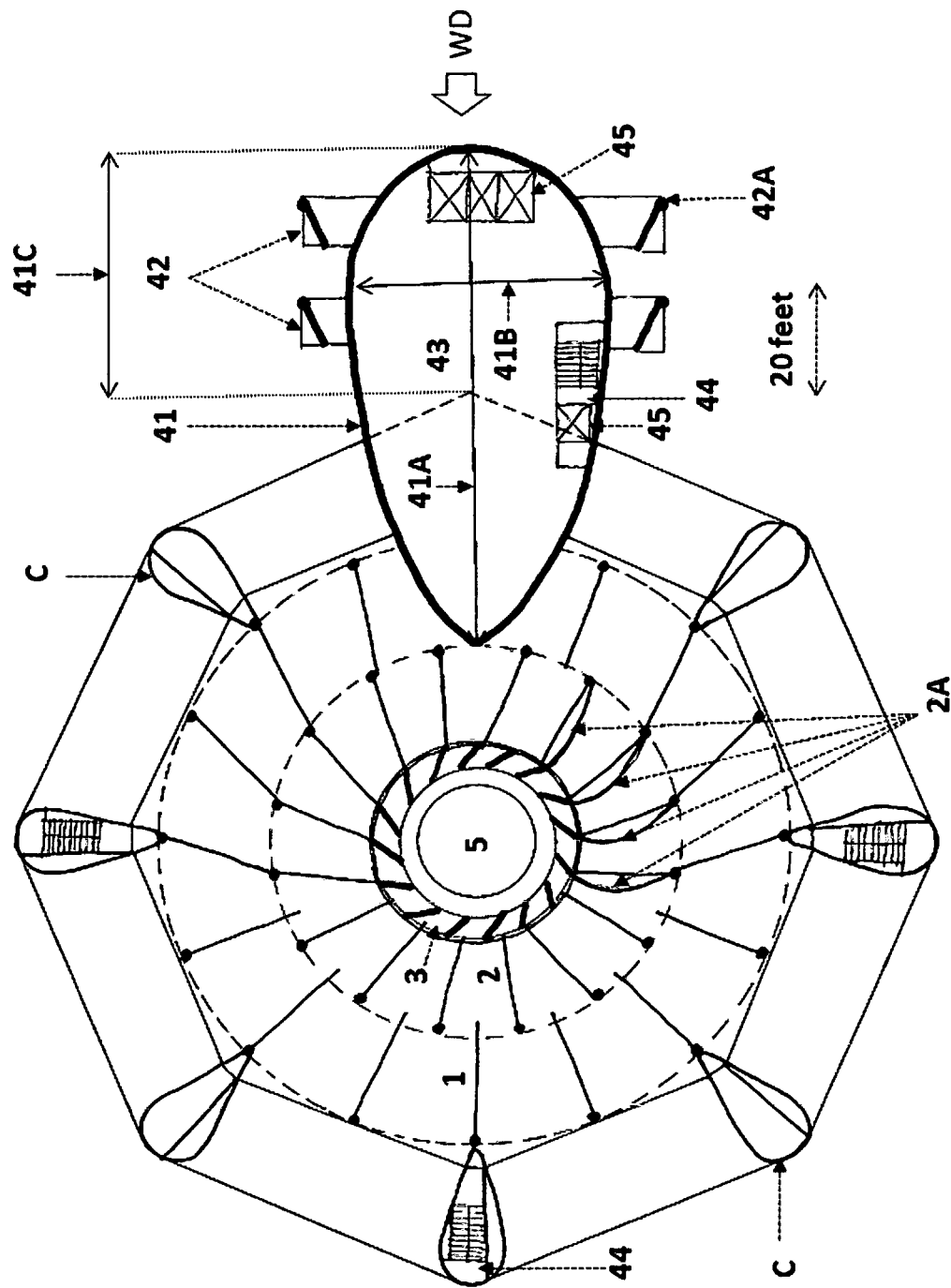
FIG. 13 Is showing a floorplan of the CIVAR Energy Tower octagonal building wind platform level with an attached curved building to house additional levels for multiple occupancies.

FIG. 13 represents a floorplan of the CIVAR Energy Tower building design variation, bringing additional space for the interior occupancy 43. The drawing depicts the CIVAR tower floor plan showing the wind platform level, embodying components as designed in the original CIVER tower configuration (see FIG. 5) with the addition of the wing type tower design 41, integrated into the original said octagonal CIVAR tower. The drawing depicts vertical wind walls C (design shape option CC) with its vertical traffic movement 44 via stairs within the wind walls, wind vanes 1, 2, 3 and protracted wind vanes 2A, as well as the central vortex tower wind generator 5. The additional wing shaped tower 41 extends to the full height of the octagonal CIVAR Tower building, providing additional vertical traffic options via elevators 45 or additional stairs. In the present CIVAR invention, depicted on this drawing, the scale provided on this drawing is for reference purpose only and it does not reflect exact dimension of the conceptual floor plan and/or its entire components. The drawing shows the incoming direction of the wind WD and wind vanes 1 and 2 on the wind platform activated by the wind to facilitate compressed wind to enter fixed wind wane 3 in a flowing undisturbed fashion.

The added wing tower is designed to facilitate unencumbered wind flow into the CIVAR Tower wind platforms by the shape of its body and by additional vertical wind vanes 42 with their vertical pivoting points 42A on the windward side. The wing tower is positioned in the middle of one of the connecting points of the CIVAR octagonal building, on the opposite side of the building's favourable prevailing winds. The pointy beginning of the winged building starts at circle of pivoting wind vane 2 and extends 100 feet 41A from the said point outward the CIVAR tower. The building is 50 feet wide 41B and extends 50 feet 41C past the outer point of octagonal intersecting point of the building. The ratio of length to width, as shown in the drawing, is 2 to 1, but some modifications can be entertained as long as the wind flow to the CIVAR tower wind platforms is not affected. In order to facilitate proper and undisturbed wind flow, it is highly recommended that the wall cladding of the CIVAR wing tower is of smooth texture, such as metal and/or composite paneling,

FIG. 14

FIG. 14 shows two schematic floor plans, one to the left side, 14A is the same drawing as depicted in FIG. 13, showing the octagonal CIVAR Energy Tower at the wind platform level, vertical wind walls C, the new wing design shaped tower 41 with its vertical wind vanes and the new space for the interior occupancy 43.

The drawing to the right 14B depicts the same octagonal CIVAR Energy Tower, but showing typical occupancy level 35 floorplan, situated between wind platforms, as seen on FIG. 11. The floorplan encompasses the open space within the CIVAR octagonal building 46, excluding the central vortex tower with its multiple wind turbines 5, but includes the wing shaped tower addition 41, with its interior space 43. The FIG. 14B also depicts the vertical wind walls C, its structural interior wall CST, the vertical stairs traffic within the wind walls 44 and additional available space within the said wind walls 44A. The floor plan depicts horizontal inner perimeter wall 47 of the occupancy levels 35 as well as horizontal outside perimeter wall 48 of the said occupancy levels 35. The wing tower addition 41 encompasses elevators 45 for servicing all levels of the CIVAR Tower building with its wing addition.

FIG. 15

Figure 15:
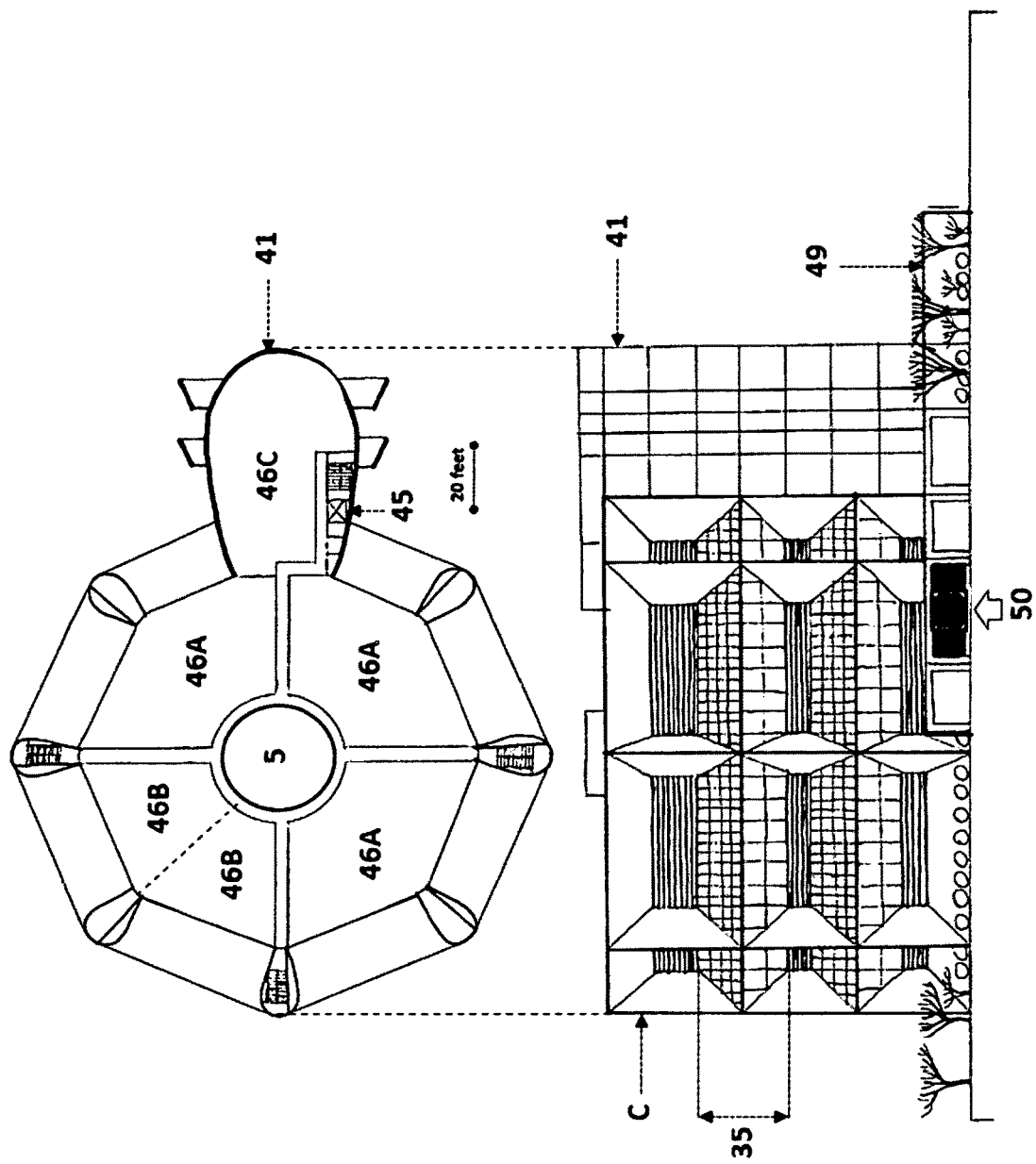
FIG. 15 Shows an example of the CIVAR Energy Tower occupancy level divided for residential use. Below is a conceptual elevation of a finished CIVAR Tower with its main entrance and additional extended ground level building.

FIG. 15 is a conceptual drawing showing typical occupancy levels 35 (see also drawing 11), being the occupancy floorplans of the CIVAR Energy Tower with its wing shaped addition. In the present invention of the CIVAR Energy Tower, the configuration in this schematic drawing depicts an example of space divisions of the floorplan showing spaces 46A to be used for condo or apartment occupancy with approximately 3,000 square feet per space, and 46B as smaller division for smaller apartments occupying 1,500 square feet per space. The space in the wing tower 46C can be used as one unit or divided into two smaller units. The floor plan also shows travel corridors, staircases 44 (see FIG. 14) and elevators 45.

The drawing also depicts a conceptual drawing of the exterior elevation of the CIVAR Energy Tower building in its totality, including the wing tower addition 41. In this drawing, the elevation shows a slight variation of the wind walls C and the occupancy levels 35 are shown with an exterior sloped option 35B as shown on the FIG. 11. The building also encompasses a ground floor addition 49, with its entrance 50, to be used for public, office or commercial purposes. The addition 49 is an optional addition and does not form part of the present CIVAR Energy Tower invention. Its existence is for the purpose of showing good flexibility of CIVAR Energy Tower building invention to adapt to various needs of everyday living, while creating its own energy by using the invention, as described and depicted in said present invention.

FIG. 16

As seen in FIG. 16, the CIVAR mechanical room 20 (FIG. 7), which is situated in the center of building's ground or basement level (see FIG. 9), encompasses multiple heat exchangers using water or oil based circulating systems, hereafter called the heating lines, to heat with an interactive heating system the multiple vortex tower wind intakes 38, and at the same time the building's hot air, hot water supply and as well as generate power from exhaust pipe, by using geothermal and waste incineration heat.

Specifically, the function of the interactive heating system as outlined in 061, is depicted in the schematic concept showing the incoming air 51 from the central air collector 27 (FIG. 9) entering the central vortex cylinder passing through an electric fan type turbine 52, which in a neutral position, during high winds, creates energy or in an active position drives the air into the cylinder, when there is no wind. The forced air then enters a dual heat exchanger within the central cylinder HE1, heated by geothermal heat chamber 53 from geothermal heat source GTH and by incineration heat chamber 54 from incineration heat source WIH. The forced heated air then enters the upper part of the central cylinder 55 with fixed worm type wind vanes located within the cylinder, pushing the hot forced air into a spin, when passing through and exiting the top cylinder outlet to enter the central vortex tower CVT.

When passed through the heating chambers of heat exchanger HE1, the heating lines lead to the second heat exchanger HE2, entering heat chambers 53A and 54A, heating building's air coming from building 56, driven and controlled by a fan 57, passing through both heating chambers and exiting on top to return to the building hot supply BHS. After both heating lines have exited the second heat exchanger HE2, they enter the third heat exchanger HE3 to heat with combined heat chambers 54C the domestic water supply coming from a ground supply 58 and exiting to the building 59 to be used for mixed purposes. Additional on-demand electric water heaters can be located in various locations to accommodate various needs.

The only heating unit producing polluted exhaust in this system is the waste incineration unit WIH, which is a furnace that can produce very high heat. The said unit using air supply 60 to feed the fire, has still a very hot exhausting air leaving the furnace, which is led through a multi-stage cleaning module 61 with various filtering systems using many known existing technologies and catalysts for cleaning and filtering of the exhaust fumes by first changing carbon monoxide to carbon dioxide, then to breathable air (or similar systems available on the market), and then with help of in-line fans 62, lead the still hot but clean exhaust air through a numerous heat exchangers 63 to operate multiple sterling engines 64, which run electric generators 65, to supply power 66 for running multiple equipment, and then finally exiting the building (with a help from a fan if necessary) as a clean, low heat, exhaust 67.

While preferred materials for elements and embodiments of CIVAR Energy Tower invention have been described, the invention is not limited by these materials. Other materials may comprise some or all of these elements in various embodiments of the present invention.

Although the present CIVAR Energy Tower invention as described and depicted herein in its entirety, as well as its plurality of embodiments with specific references to preferred embodiments and specific examples thereof, it will be apparent to those of ordinary skills in the art that other embodiments and examples may perform similar functions in a variety of applications, but do differ from the CIVAR Energy Tower in its entirety and plurality of this inventions.

In various embodiments, CIVAR Energy Tower embodies an invention comprising of multiple principles and innovative components, combined into one visually appealing energy recovery structure offering interior spaces for multiple occupancies, to help in solving today's clean energy needs, without creating unwanted visual obstructions in populated areas, such as typical large wind turbines represent, and offering a long lifespan of clean energy production until in many decades from now, a revolutionary new clean and inexpensive energy production has been developed. The CIVAR structure can be at that time easily adapted by changing all its wind platform levels to become occupancy space, forming part of the complete building.

Embodiments of the invention provide for a Vortex Acceleration Wind Energy Tower embodying production of electrical energy, free of $CO_2$ emission, by using the sun, the wind and geothermal and incineration heat, with input and simultaneous interaction of plurality principles and functions, comprising of the following principal participating components:

The physical design of the building itself (combining architecture with wind collection principles)

Multiple fixed, pivoting wind vanes and wind twisters (using sailing principles)

Forced wind air heating, spinning and introduction of same to the central vortex tower (using chimney principle)

Central Vortex tower design and function (using tornado principle)

Wind syphon and suction (using bathroom fan principle)

Compounding and accelerating vortex wind power by way of active simultaneous compression and syphoning action (using Ventura principles).

Embodiments of the invention provide for an octagonal (multi angled or circular) physical building, embodying the design, it's shape, proportions and associated functions thereof, specifically for this purpose designed structure to act as a vertical and as a horizontal wind collector comprising of multiple components capturing a portion potentially approaching 100% of its wind exposure and channeling it unencumbered by compressing and accelerating the incoming wind into the building's wind platforms, for the purpose of creating a wind vortex within the building, and encompassing plurality of sloped horizontal walls with transparent solar panels and glass panels to generate electricity and capture natural light to the interior of multiple occupancy units.

In some embodiments, the building's outside perimeter vertical wind wall design, being the same height as the CIVAR tower and forming part of the octagonal building structure, is specifically designed to channel the incoming wind toward the building, using its shape and configuration, which can be multi-angled or of curved type, with its flat vertical structural wall within the outside wall, and using smooth exterior surface treatment such as metal or composite paneling, with a recommendation for maximum effectiveness using that of a curved exterior wall configuration, embodying a wider circle on the perimeter of the said wall and then narrowing the wall to inner point in a straight line to meet the pivoting point of the outside ring wind vane to the vane pivoting point.

In various embodiments, the building includes multiple wind platform inlets, channeling the incoming compressed wind into the central vortex tower, and building units, with peripheral horizontal sloped walls leading to a point at the outside perimeter, cladded with transparent solar panels, to be used for singular and/or multiple interior occupancies (such as residential, office, commercial and light industrial purposes), positioned between the said multiple wind platform inlets, which are acting as horizontal wind collectors, compressing the incoming wind using Ventura principal and channel it into the multiple wind platforms.

In various embodiments, the building includes the tower configuration as described above, but using the ground, the base and the top unit and wind platforms positioned between said units as a starting assembly point, and stack one or plurality of middle units, being the same as the top unit, between the base and top unit, thus creating a vertically stacked CIVAR tower with plurality of interior occupancy levels as well as higher energy production to satisfy buildings requirements.

In various embodiments, the building includes peripheral wind platform louvered inlets, designed specifically for the CIVAR building, with functional horizontal louvres with built-in heating option for cold climate zones, built from ridged, non-rusting water repelling materials, to automatically open and close with a typical horizontal louvre operating system, for either maintenance of the wind platform areas or increasing and decreasing the wind flow into the interior of wind platforms, and to provide a visual and sound barrier, looking from the exterior onto the building, as well as provide a ridged wire screen built from non-rustic material for protection against birds entering the said wind platforms.

In various embodiments, the building is specifically designed for the purpose of accelerating the wind vortex within the central tower, with the increase of tower diameter by every wind platform intake, comprising a plurality of said wind platform intakes looking upward, to allow multiple wind volumes to enter the central tower through wind twisters without wind chocking effects and allow wind deflection by exiting the tower through its widening top exit diameter.

In various embodiments, the building includes a wing shaped building addition to the CIVAR Tower building, with proportions of 5 units being the length and 2.5 units being at the widest part of the building, with the width of CIVAR tower ring 1 and 2, each representing one unit (20 feet), comprising of a wing type curved building with smooth metal or composite cladding, being the same height as the CIVAR tower, and the wing's tip point of the building protruding the CIVAR tower ending at said tower's pivoting point of the middle ring wind vanes 2.

In various embodiments, and designed specifically for CIVAR tower, the wing building (addition) includes two rows of vertically operating wind vanes, with a limited but advantageously calculated swing range toward the building's center, built of ridged and water repelling materials, with horizontal frames structure strategically positioned around the tower for maximum wind channeling effectiveness, using a plurality of said horizontal frames attached to the building and vertically pivoting said wind vanes positioned on said horizontal frame, operated by the incoming wind, directing the wind toward the central vortex tower.

Various embodiments provide for a specific positioning of multiple fixed and active wind vanes in wind platforms, channeling and compressing the wind into a vortex spin and compounding it with multiple wind entry platforms, comprised of outside ring pivoting ridged wind vanes, middle ring pivoting and deflecting wind wanes and inner ring fixed wind twister vanes.

In some embodiments, the outside ring includes ridged pivoting wind vanes, comprising of an open ridged frame, solid panel within the frame, retractable bottom and/or top pivot pin with metal or nylon low friction pivot washers, rubber type top and bottom bumpers on the opposite side of the frame's pivoting location to soften the impact when hitting floor and ceiling restrictors at the middle ring wind vanes pivoting points, located in a CIVAR octagonal structure with their pivoting location positioned at every intersecting point of the said octagonal structure as well as in the center between the intersecting octagonal points of said building, resulting in total of 16 pivoting ridged wind vanes, with specific swing range, the range being between pivoting points of the middle ring wind vanes, to smoothly channel the incoming wind to the middle wind vanes.

The vanes have a limited swing range, and the extremes of this range are referred to as ends of the limited swing range, or alternatively as backstopped positions. The limitation on the swing range is provided for by causing a part of the vane (e.g. the innermost edge which is located away from the pivot anchor of the vane and which travels when the vane swings) to contact a fixed object. The fixed object can be an anchored part of another vane radially inward of the vane. The fixed object can be a fixed part of a wind twister.

In some embodiments, the middle ring pivoting wind vanes includes an open ridged frame, consisting of 3 horizontal and 2 vertical ridged members, built out of aluminum or composite materials, with a housing at the pivoting point to house a retractable sail or bending panel, protracting when it is positioned behind the said frame of the incoming wind direction and retracting into the said housing to form a straight vane form when the said sail or bending panel is positioned in front of the said frame, being on the windward side of the incoming wind.

In various embodiments, looking downwind, the protractible middle ring wind vane sail has battens or a ridged but bendable panel mounted between the pivoting point location inside a fully enclosed vertical ridged housing with an outgoing point type deflected opening of the said housing, located behind the frame (being the pivoting point of the said vane), and stretched to or mounted on the opposite vertical side of same vane's frame, protracting by the force of the wind and retracting by a spring or similar mechanisms located within the vane's housing and which has a retractable preventer lines mounted to the open frame to restrict the deflection of the said sail and or panel.

In various embodiments, wind twisters of several diameter are built of aluminum or composite water repellent material, comprised of the wind platform's inner ring dual action fixed vortex wind vanes, positioned and angled to channel the active incoming wind into a circular and upward direction into the central vortex tower and at the same time create a suction force on the passive side of the wind intake, syphoning the wind from that side through the said dual action wind twister into the central vortex tower.

In various embodiments, the wind twisters of several different diameter are such that the diameter, comprising of the bottom inner inlet diameter for vertically incoming wind from bellow and upper exit outlet diameter forming the top of the wind twister outlet for vertically exiting wind, is measured horizontally and its size is matched with the upwardly increasing width of the vortex tower at different wind platform inlets, allowing additional wind mass entering the vortex tower, thus increasing the vortex power of the wind.

In various embodiments, the inner ring wind twisters embody a plurality of fixed wind vanes, wherein the vertical wind vanes are designed to match the incoming angle of wind from wind platform's middle ring wind vanes (with both having opposite pivoting location in relation to the incoming wind), continue to guide the said wind in the same direction as the incoming wind directed by the said middle wind vanes, compress it and direct it into the central vortex tower, creating a circular vortex type wind motion, while at the same time produce a negative pressure on the passive wind twister intake side and syphon the available air from the passive intake side into the central wind vortex.

In various embodiments, the lengths of the twister's wind vanes are longer at the lower vortex tower, where the wind enters above CIVAR ground unit, being the ground unit wind intake, and shorter on the middle wind twister, where the wind enters above the CIVAR base unit, being the base unit wind intake, to facilitate the increased diameter of the central vortex tower thus allowing increase of wind mass entering the said tower.

In various embodiments, the inner ring wind twister, embody a plurality of 16 fixed wind vanes, is designed to match the incoming angle of exiting wind from middle ring wind vanes, and is located at the exact center of middle wind vane's swing range with their starting point at the outside perimeter of the said swing range to match the said wind vane's openings when they are activated by the wind and pushed into the outside points of the said wind twister vertical vanes.

In various embodiments, the inner ring wind twister embodies an enclosure comprised of two circular concave shaped rings, the lower being the base component and the upper ring the ceiling component, wherein the base is horizontal at the outer perimeter of the ring and curving upward toward the inner smaller perimeter of the said ring, thus forming a continuous unencumbered flow of the wind upward into the central vortex tower, entering the said central vortex tower at a 45 degrees angle, and the ceiling component of the said wind twister, being the same height as the wind intake platform (with the base's inner outlet being same or lower in height), starting horizontally at the ceiling of the wind intake at the outer perimeter of the ring and curving upward toward the inner smaller perimeter of the said ceiling ring, matching the diameter of the central vortex tower above, forming a continuous unencumbered flow of the wind upward into the central vortex tower, entering the said central vortex tower at a 45 degrees angle, with dimensions, degrees, and/or % of heights of the wind twister as described hereunto are modifiable to meet various needs, as long as the said variation stays true to the design concept and its intended function.

In various embodiments, the mechanical hot forced air system is located at the bottom of CIVAR central vortex tower, comprising of a plurality of embodiments: the integration of geothermal and incineration heating units into one system, multiple air inlets to feed the central vortex tower, integrated triple heat exchanger system for feeding the forced hot air twisted by a vertical warm drive located in the cylinder above the heat exchangers, twisting the hot air upward into central vortex tower, heating hot air for the building, heating domestic water supply for the building and an exhaust system to run multiple sterling engines to generate electric power.

In various embodiments, the CIVAR central vortex forced air heating system includes multiple wind inlets at the building ground floor, with ducts leading to the central mechanical room through a fan type bladed electric motor, set in neutral or in operating mode, into the bottom of a vertical cylinder type enclosure with twin heat chamber exchangers within, heated by geothermal and incineration heat by burning plant and human waste and a top cylinder section comprising of multiple row of worm type vanes on the inside perimeter of the said cylinder, to spin the incoming forced air as it exits the top of said cylinder.

In various embodiments, the integrated heat exchangers includes a geothermal heating chamber and an incineration heating chamber of the central tower cylinder unit, with exiting heating lines coming from their heating chambers, entering the second heat exchanger also comprising of said dual heating chambers, to heat and or cool the air for the CIVAR building interior occupancy spaces.

In various embodiments, a continuous integration of heat exchangers includes geothermal and incineration heating chambers, with exiting heating lines coming from the second heat exchanger's heating chambers, entering into the third heat exchanger comprising of combined heating chambers as one unit, to heat the domestic water supply for the CIVAR building interior occupancy spaces.

In various embodiments, a combined action for treatment and usage of energy from waste incineration furnace exhaust heat uses known existing technologies and catalysts for cleaning and filtering of the exhaust fumes by first changing carbon monoxide to carbon dioxide, then to breathable air (or similar systems available on the market), and then, with help of in-line fans, lead the still hot but clean exhaust air through a numerous air to liquid heat exchangers to operate multiple sterling engines, which run smaller electric generators.

What is claimed is:

1. An energy-harvesting building structure comprising:
   a plurality of levels;
   a central vortex tower passing each of the plurality of levels and configured to direct moving air received from the plurality of levels upward toward an outlet at a top of the building structure;
   at least one wind powered turbine located in the central vortex tower for harvesting energy from wind;
   a plurality of horizontally oriented wind intakes each disposed within a different respective one of the plurality of levels, each horizontally oriented wind intake exposed to an incident wind via wind inlets facing an exterior of the building structure in a plurality of different directions;
   in each horizontally oriented wind intake, a plurality of movable wind vanes each pivotably mounted on a respective vertical pivot axis, the movable wind vanes each having a limited swing range and configured, depending on exposure to the incident wind, to pivot into a corresponding position at an end of the limited swing range thereof for redirecting the incident wind to spiral inward toward the central vortex tower; and
   in at least one of the horizontally oriented wind intakes, a respective wind twister located radially inward of the plurality of movable wind vanes and defining a plurality of fixed air directing surfaces configured to receive and redirect the incident wind from the movable wind vanes, so that the incident wind continues to spiral inward and is directed upward into the central vortex tower to feed an air vortex in the central vortex tower for driving the at least one wind powered turbine.

2. The building structure of claim 1, wherein the plurality of movable wind vanes comprise a first plurality of wind vanes disposed in a radially outer portion of the horizontally oriented wind intake, and a second plurality of wind vanes disposed in a radially inner portion of the horizontally oriented wind intake, a radially inward edge of each of the first plurality of wind vanes configured to abut with a radially outward edge of a corresponding one of the second plurality of wind vanes to form a surface for redirecting the incident wind.

3. The building structure of claim 1, wherein at least some of the movable wind vanes comprise a selectively deformable portion mounted on one side of an open frame, the selectively deformable portion having a first face and a second face opposite the first face, wherein when the deformable portion is on a leeward side of the open frame with respect to the incident wind, the first face is exposed to the incident wind and the second face is leeward from the incident wind, the selectively deformable portion deforms to cause the first face to have a generally concave vertical surface for redirecting the incident wind along a curved path, and when the deformable portion is on a windward side of the open frame with respect to the incident wind, the second face is exposed to the incident wind and the first face is leeward from the incident wind, the selectively deformable portion deforms to cause the second face to have a generally flat vertical surface for redirecting the incident wind along a straight path.

4. The building structure of claim 3, wherein the selectively deformable portion comprises a flexible vertical surface suspended from an open frame, the open frame configured to contact the flexible vertical surface to inhibit curving thereof when the second face is exposed to the incident wind and the first face is leeward from the incident wind.

5. The building structure of claim 3, wherein the selectively deformable portion comprises a pair of surfaces coupled together using a hinged connection, the hinged connection allowing a limited range of relative pivoting of the pair of surfaces about a vertical axis.

6. The building structure of claim 3, wherein the flexible vertical surface is a retractable sail or surface, each of the at least some of the movable wind vanes further comprising a housing for the retractable sail or surface, and a mechanism biased to retract the retractable sail or surface into the housing.

7. The building structure of claim 1, wherein the wind inlets are exposed to incident wind from all horizontal directions.

8. The building structure of claim 1, wherein the building structure is a multi-angled building structure.

9. The building structure of claim 1, wherein an uppermost one of the horizontally oriented wind intakes is configured to feed the incident wind horizontally to a further twin wind powered turbine located in the central vortex tower and aligned with the uppermost one of the horizontally oriented wind intakes, the further twin wind powered turbine configured, when driven by wind from the uppermost one of the horizontally oriented wind intakes to draw air upward within the central vortex tower.

10. The building structure of claim 1, further comprising a plurality of horizontally oriented Venturi funnel structures located outward of the wind inlets, the Venturi funnel structures comprising a top face, a bottom face, or a combination thereof, configured to receive and concentrate the incident wind toward the wind inlets.

11. The building structure of claim 1, further comprising one or more vertical exterior walls each configured to receive and redirect incident wind inward toward a corresponding one of the wind inlets.

12. The building structure of claim 1, further comprising a hot forced air generation system situated below a lowermost one of the horizontally oriented wind intakes, the hot forced air generation system configured to generate hot air and feed the hot air upward into the central vortex tower in an upward spiral corresponding to the air vortex.

13. The building structure of claim 1, further comprising one or more occupiable building levels, wherein at least one of the occupiable building levels is situated between successive horizontally oriented wind intakes.

14. The building structure of claim 1, wherein the central vortex tower increases upwardly in diameter when passing at least one of the plurality of horizontally oriented wind intakes.

15. The building structure of claim 14, wherein a first one of the respective wind twisters is level with a first one of the horizontally oriented wind intakes, a second one of the respective wind twisters is level with a second one of the horizontally oriented wind intakes above the first one of the horizontally oriented wind intakes, and a diameter of the first one of the respective wind twisters is less than a diameter of the second one of the respective wind twisters.

16. The building structure of claim 1, wherein the wind inlets comprise adjustable louvers reconfigurable between an open position for allowing wind passage and a closed position for inhibiting wind passage.

17. The building structure of claim 1, wherein the wind twister is configured to channel incoming wind on an active side into a circular and upward direction into the central vortex tower, and further to create a suction force on a passive side, syphoning air from the passive side into the central vortex tower.

18. The building structure of claim 1, wherein the plurality of fixed air directing surfaces define a plurality of channels each including a respective wind inlet and wind outlet, and wherein the wind outlets of each one of the plurality of channels are directed upward, to inhibit wind expelled therefrom from passing into each other one of the plurality of channels.

19. The building structure of claim 1, wherein the plurality of fixed air directing surfaces of the wind twister define channels of gradually decreasing cross-sectional area for compressing the incident wind.

20. The building structure of claim 1, wherein the plurality of fixed air directing surfaces of the wind twister and the plurality of movable wind vanes are cooperatively configured to gradually redirect the incident wind.

\* \* \* \* \*